US011698202B2

(12) United States Patent
Desrochers

(10) Patent No.: US 11,698,202 B2
(45) Date of Patent: Jul. 11, 2023

(54) EXHAUST DEMAND CONTROL SYSTEM AND METHODS

(71) Applicant: Measured Air Performance, LLC, Merrimack, NH (US)

(72) Inventor: Eric Desrochers, Merrimack, NH (US)

(73) Assignee: Measured Air Performance, LLC, Merrimack, NH (US)

( * ) Notice: Subject to any disclaimer, the term of this patent is extended or adjusted under 35 U.S.C. 154(b) by 0 days.

(21) Appl. No.: 17/822,474

(22) Filed: Aug. 26, 2022

(65) Prior Publication Data

US 2022/0412587 A1  Dec. 29, 2022

Related U.S. Application Data

(62) Division of application No. 16/141,109, filed on Sep. 25, 2018, now Pat. No. 11,460,203.
(Continued)

(51) Int. Cl.
*F24F 11/00* (2018.01)
*F24F 7/06* (2006.01)
(Continued)

(52) U.S. Cl.
CPC ............ *F24F 11/0001* (2013.01); *F24F 7/06* (2013.01); *F24F 11/30* (2018.01); *F24F 11/32* (2018.01);
(Continued)

(58) Field of Classification Search
CPC .... F24F 2011/50; F24F 2011/65; F24F 11/00; F24F 11/0001; F24F 11/30; F24F 11/32;
(Continued)

(56) References Cited

U.S. PATENT DOCUMENTS

| 4,160,407 A | 7/1979 | Duym |
| 4,706,553 A | 11/1987 | Sharp et al. |

(Continued)

FOREIGN PATENT DOCUMENTS

| DE | 102005061787 A1 * | 6/2007 | ............ B08B 15/02 |
| DE | 102016102332 A1 * | 8/2017 | ................ F24F 1/16 |

(Continued)

OTHER PUBLICATIONS

ASHRAE, "Ventilation for Acceptance Indoor Air Quality;" ANSI/ASHRAE Standard 62.1-2016; Jan. 2016; 60 Pages.
(Continued)

*Primary Examiner* — Edelmira Bosques
*Assistant Examiner* — Frances F. Hamilton
(74) *Attorney, Agent, or Firm* — Daly Crowley Mofford & Durkee, LLP

(57) ABSTRACT

Methods and apparatus for an exhaust demand control system for measuring one or more contaminants at one or more exhaust locations within one or a plurality of exhaust ducts or plenums served by an exhaust fan system. Example systems and methods can include sensing the one or more contaminants within the one or more exhaust duct locations using a multipoint air sampling system having one or more sensors and comparing contaminant concentration measurements from the one or more of said exhaust duct or plenum locations against an action level to create a fan setback signal.

20 Claims, 12 Drawing Sheets

Related U.S. Application Data

(60) Provisional application No. 62/581,877, filed on Nov. 6, 2017.

(51) Int. Cl.

| | | |
|---|---|---|
| *F24F 11/32* | (2018.01) | |
| *F24F 11/49* | (2018.01) | |
| *F24F 11/30* | (2018.01) | |
| *F24F 110/50* | (2018.01) | |
| *F24F 110/65* | (2018.01) | |
| *G01N 1/22* | (2006.01) | |
| *F24F 11/61* | (2018.01) | |
| *G01N 1/26* | (2006.01) | |
| *F24F 120/10* | (2018.01) | |

(52) U.S. Cl.
CPC ............ *F24F 11/49* (2018.01); *G01N 1/2258* (2013.01); *F24F 11/61* (2018.01); *F24F 2110/50* (2018.01); *F24F 2110/65* (2018.01); *F24F 2120/10* (2018.01); *G01N 1/26* (2013.01); *G01N 2001/2264* (2013.01)

(58) Field of Classification Search
CPC ........ F24F 11/49; F24F 11/61; F24F 2110/65; F24F 2120/10; G01N 1/2258
USPC .......................................................... 454/239
See application file for complete search history.

(56) References Cited

U.S. PATENT DOCUMENTS

| | | | |
|---|---|---|---|
| 4,806,076 A | 2/1989 | Andrews | |
| 4,893,551 A | 1/1990 | Sharp et al. | |
| 5,115,728 A | 5/1992 | Ahmed et al. | |
| 5,240,455 A | 8/1993 | Sharp | |
| 5,257,736 A | 11/1993 | Roy | |
| 5,385,505 A | 1/1995 | Sharp et al. | |
| 5,439,414 A | 8/1995 | Jacob | |
| 5,545,086 A | 8/1996 | Sharp et al. | |
| 5,564,626 A * | 10/1996 | Kettler ...................... F24F 8/10 | 55/471 |
| 5,596,154 A | 1/1997 | Baughman | |
| 5,773,833 A | 6/1998 | Hsi | |
| 6,125,710 A * | 10/2000 | Sharp ....................... G01N 1/26 | 73/864.81 |
| 6,137,403 A | 10/2000 | Desrochers et al. | |
| 6,241,950 B1 * | 6/2001 | Veelenturf ............... G01N 1/26 | 422/537 |
| 6,318,150 B1 | 11/2001 | Temple | |
| 6,425,297 B1 | 7/2002 | Sharp | |
| 6,448,896 B1 * | 9/2002 | Bankus .................... F24F 11/52 | 340/607 |
| 6,609,967 B2 * | 8/2003 | Sharp ....................... F24F 11/30 | 62/214 |
| 6,646,444 B2 | 11/2003 | Dolgov et al. | |
| 6,669,547 B2 | 12/2003 | Liu | |
| 6,790,136 B2 | 9/2004 | Sharp et al. | |
| 6,890,252 B2 | 5/2005 | Liu | |
| 7,302,313 B2 * | 11/2007 | Sharp ................. G01N 33/0075 | 700/282 |
| 7,360,461 B2 | 4/2008 | Desrochers et al. | |
| 7,389,158 B2 | 6/2008 | Desrochers et al. | |
| 7,389,704 B2 | 6/2008 | Desrochers et al. | |
| 7,415,901 B2 | 8/2008 | Desrochers et al. | |
| 7,421,911 B2 | 9/2008 | Desrochers et al. | |
| 7,765,072 B2 | 7/2010 | Eiler et al. | |
| 8,147,302 B2 * | 4/2012 | Desrochers .............. F24F 11/63 | 702/50 |
| 9,182,139 B2 | 11/2015 | Fujimura et al. | |
| 9,423,128 B2 * | 8/2016 | Gans .................... F23L 17/005 | |
| 9,651,531 B2 | 5/2017 | Desrochers | |
| 9,945,571 B2 | 4/2018 | Omura et al. | |
| 10,031,258 B2 | 7/2018 | Akselrod et al. | |
| 10,592,821 B2 | 3/2020 | Denton et al. | |
| 10,876,746 B2 | 12/2020 | Handsaker et al. | |
| 2002/0072322 A1 | 6/2002 | Sharp et al. | |
| 2004/0014417 A1 | 1/2004 | Katz | |
| 2005/0048896 A1 * | 3/2005 | Shaben ..................... F24F 11/30 | 454/49 |
| 2007/0032187 A1 | 2/2007 | Liu | |
| 2009/0191803 A1 | 7/2009 | Barrette et al. | |
| 2010/0291850 A1 | 11/2010 | Sabbaghian et al. | |
| 2014/0260692 A1 * | 9/2014 | Sharp ....................... F24F 11/74 | 73/863.23 |
| 2015/0004898 A1 | 1/2015 | Desrochers | |
| 2015/0124853 A1 | 5/2015 | Huppi et al. | |
| 2015/0276250 A1 * | 10/2015 | Lintern .................. C09K 8/528 | 454/251 |
| 2015/0323427 A1 | 11/2015 | Sharp | |
| 2016/0061797 A1 | 3/2016 | Kocher | |
| 2017/0248335 A1 | 8/2017 | Litomisky | |
| 2017/0356666 A1 | 12/2017 | Adkerson | |
| 2018/0031264 A1 * | 2/2018 | Atchison .................. F24F 11/30 | |
| 2018/0031727 A1 | 2/2018 | Akselrod et al. | |
| 2019/0137126 A1 | 5/2019 | Desrochers | |

FOREIGN PATENT DOCUMENTS

| | | | | |
|---|---|---|---|---|
| GB | 2209070 A | * | 4/1989 | .......... F24C 15/2021 |
| JP | H07 324788 A | | 12/1995 | |
| KR | 0149632 B1 | * | 3/1999 | .............. F24F 11/33 |
| WO | WO 98/46978 A1 | | 10/1998 | |
| WO | WO 2007/095675 A1 | | 8/2007 | |
| WO | WO 2010/140001 A1 | | 12/2010 | |

OTHER PUBLICATIONS

Carter et al., "Saving Energy in Lab Exhaust Systems;" ASHRAE Journal—Jun. 2011; Technical Feature; www.ashrae.org; 7 Pages.
Crowley, "University Lab: Model for Energy Efficiency;" ASHRAE Journal—Jul. 2017; 2017 ASHRAE Technology Aware Case Study; www.ashrae.org; 6 Pages.
*Guide for the Care and Use of Laboratory Animals*, Institute of Laboratory Animal Resources, Commission on Life Sciences, National Research Council; National Academy Press; ISBN 0-309-58869-3; Jan. 1996; 140 Pages.
*Laboratory Ventilation*, ANSI/AIHA Z9.5-2012; American Industrial Hygiene Association; ISBN 978-1-935082-34-7; Apr. 26, 2012; 138 Pages.
Sharp, "Demand-Based Control of Lab Air Change Rates;" ASHRAE Journal—Feb. 2010; www.ashrae.org; 9 Pages.
*Ventilation for Acceptable Indoor Air Quality*, ANSI/ASHRAE Standard 62.1-2016; ISSN 1041-2336; Jan. 2016; 60 Pages.
PCT International Search Report and Written Opinion dated Feb. 11, 2019 for International Application No. PCT/US2018/058604; 21 Pages.
PCT International Preliminary Report dated May 22, 2020 for International Application No. PCT/US2018/058604; 15 Pages.
Great Britain Examination Report dated Jul. 29, 2021 for Great Britain Application No. 2006894.6; 2 Pages.
Response to Great Britain Examination Report dated Jul. 29, 2021 for Great Britain Application No. 2006894.6; Response Filed Sep. 17, 2021; 14 Pages.
$2^{nd}$ Great Britain Examination Report dated Nov. 8, 2021 for Great Britain Application No. 2006894.6; 3 Pages.
Response to $2^{nd}$ Great Britain Examination Report dated Nov. 8, 2021 for Great Britain Application No. 2006894.6; Response Filed Nov. 23, 2021; 53 Pages.
Great Britain Intention to Grant dated Dec. 24, 2021 for Great Britain Application No. 2006894.6; 2 Pages.
U.S. Restriction Requirement dated Sep. 17, 2021 for U.S. Appl. No. 16/141,109; 5 Pages.
Response to U.S. Restriction Requirement dated Sep. 17, 2021 for U.S. Appl. No. 16/141,109; Response filed Oct. 4, 2021; 1 Page.
U.S. Non-Final Office Action dated Jan. 26, 2022 for U.S. Appl. No. 16/141,109; 15 Pages.

(56) References Cited

OTHER PUBLICATIONS

Response to U.S. Non-Final Office Action dated Jan. 26, 2022 for U.S. Appl. No. 16/141,109; Response filed Apr. 25, 2022; 11 Pages.
U.S. Notice of Allowance dated Jun. 10, 2022 for U.S. Appl. No. 16/141,109; 15 Pages.

* cited by examiner

| State # | Sampled Location | Sampling Mode | Valve 903 State | | Valve 904 State | | 2-Way Valves | | | | Description | Results |
|---|---|---|---|---|---|---|---|---|---|---|---|---|
| | | | Port AB | Port AC | Port AB | Port AC | Valve 621 State | Valve 618 State | Valve 615 State | Valve 612 State | | |
| 1001 | 317 | Purge | Closed | Open | Closed | Open | Open | Closed | Closed | Closed | Purge sample 317 | |
| 1002 | 317 | Sense | Closed | Open | Open | Closed | Open | Closed | Closed | Closed | Sense Sample 317 | Low Contaminant Levels |
| 1003 | 316 | Purge | Closed | Open | Closed | Open | Closed | Open | Closed | Closed | Purge sample 316 | |
| 1004 | 316 | Sense | Closed | Open | Open | Closed | Closed | Open | Closed | Closed | Sense Sample 316 | Low Contaminant Levels |
| 1005 | 315 | Purge | Closed | Open | Closed | Open | Closed | Closed | Open | Closed | Purge sample 315 | |
| 1006 | 315 | Sense | Closed | Open | Open | Closed | Closed | Closed | Open | Closed | Sense Sample 315 | Low Contaminant Levels |
| 1007 | 314 | Purge | Closed | Open | Closed | Open | Closed | Closed | Closed | Open | Purge sample 314 | |
| 1008 | 314 | Sense | Closed | Open | Open | Closed | Closed | Closed | Closed | Open | Sense Sample 314 | High Contaminant Levels |
| 1009 | None | Sensor Protection | Open | Closed | Closed | Open | Open | Open | Open | Open | High concentration of contaminants in last sample. Enable Sensor Protection Mode and sequence delay 503. | |

*Figure 10*

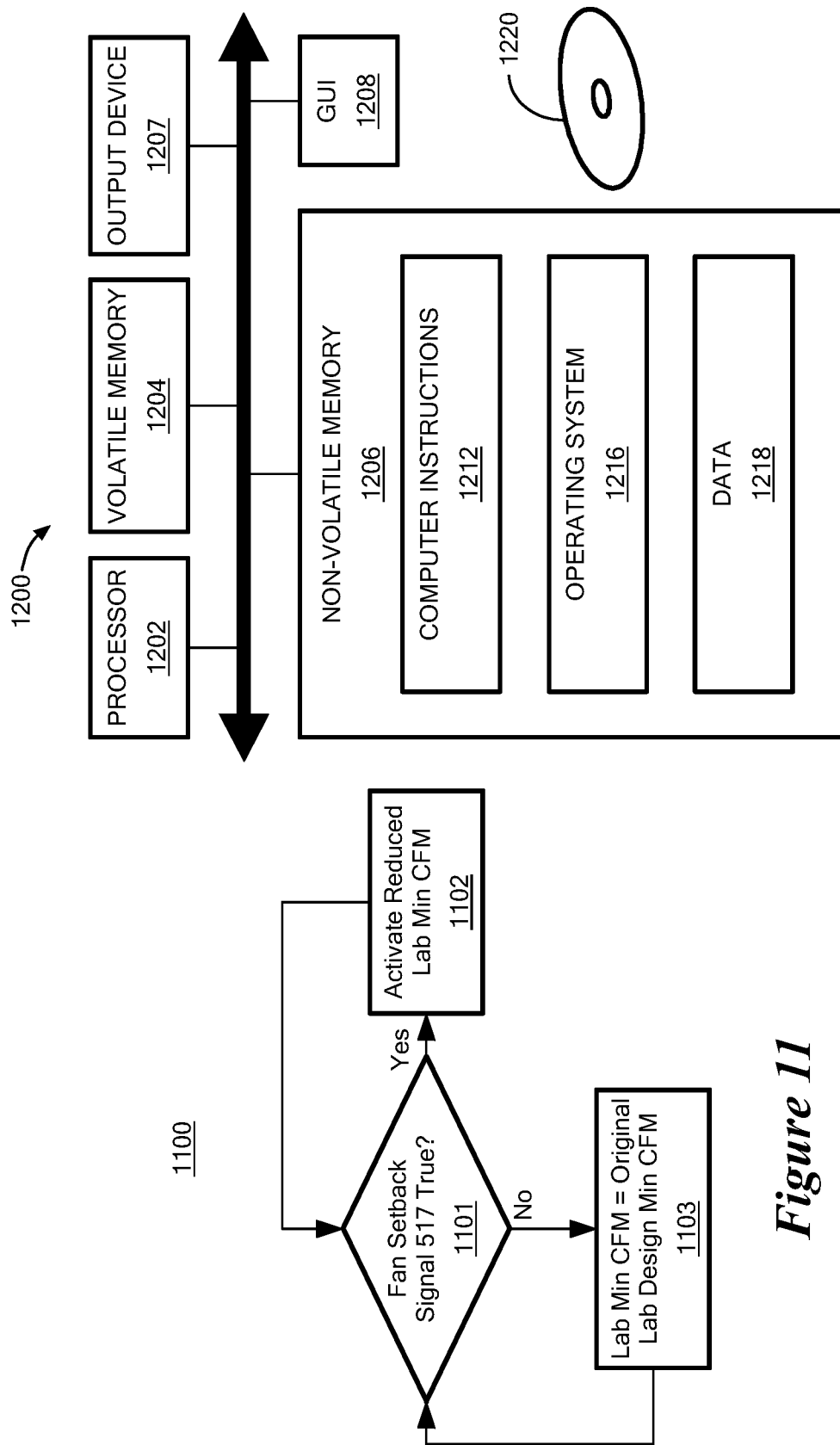

EXHAUST DEMAND CONTROL SYSTEM AND METHODS

CROSS REFERENCE TO RELATED APPLICATIONS

The present application is a divisional of U.S. patent application Ser. No. 16/141,109, filed on Sep. 25, 2018, which claims the benefit of U.S. Provisional Patent Application No. 62/581,877, filed on Nov. 6, 2017, which are incorporated herein by reference.

FIELD OF THE INVENTION

The present invention relates generally to the energy efficient operation of an exhaust fan system and, more particularly, to systems and methods used to monitor the presence of contaminates in exhaust air, and/or reducing risk when controlling exhaust fans in order to optimize exhaust fan operation in a safe manner. Some embodiments may be well suited to optimize energy use with high plume exhaust fan systems.

BACKGROUND

There are a broad range of facilities that have ventilation systems which are designed to safely support the use of chemical and biological compounds which have exposure limits at which occupant health, comfort, and productivity can be affected. This includes, but is not limited to, facilities designed for research, experimentation, production operations, testing, health care, animal and pharmaceutical research, and other applications.

Generally, ventilation energy use in these types of facilities is significant as they are often designed as what's known in the art as "single pass" ventilation systems. In these types of systems, air supplied to a room or critical location designed to handle contaminant use cannot be recirculated but must be fully exhausted from the facility after it is drawn from the critical location by the ventilation system. ASHRAE Standard 62.1-2016, which is incorporated herein by reference, defines ventilation practices for building locations based upon four categories of risk, which determines whether or not air can be recirculated to a zone. As is known in the art, only air from spaces described by ASHRAE 62.1-2016 as Class 1 environments can be recirculated to other locations in a building. Class 1 environments are generally categorized as locations, such as office environments, that have air with low contaminant concentration, low sensory-irritation intensity, and inoffensive odor. According to the standard, Class 2 air includes air that is not necessarily harmful but that is inappropriate for transfer or recirculation to spaces used for different purposes. Class 2 air may be recirculated within the space of origin, but not to Class 1 space. As is known in the art, Class 3 air is that which may have significant contaminant concentration, significant sensory-irritation intensity, or offensive odor. Class 3 air may be recirculated within the space of origin, but not to any other space. Air from most lab environments is considered as Class 3 air and therefore needs to be completely exhausted from the building. Class 4 air is considered as potentially the most harmful or objectionable. As an example, the air from a fume hood would be considered as Class 4. According to ASHRAE 62.1-2016, Class 4 air shall not be recirculated or transferred to any space and not be recirculated within the space of origin.

Whether or not air is exhausted from a building or is partially or wholly recirculated, influences the amount of heating and cooling energy as well as fan energy that must be provided. Generally, when air is allowed to be recirculated within a building the heating and cooling energy as well as the fan energy use will be substantially lower.

FIG. 1 is a simplified illustration of a prior art ventilation system which incorporates recirculated air from 5 zones. The ventilation system shown in FIG. 1 includes a supply fan and a return fan. Those familiar with the art of ventilation systems will recognize that there are a number of different fan configurations used in recirculating air systems (also known as mixed air systems). The supply fan delivers supply air to each zone via a common supply plenum. A portion of the total supply airflow is delivered to each zone via zone boxes (ZB-1, ZB-2, ZB-3, ZB-4, and ZB-5) which may include any method known to the art to adjust airflow. In actual application, the supply fan may serve any number of zones and airflow levels delivered to each zone will vary based on space cooling, heating and outside air ventilation requirements. With a return air system such as that of FIG. 1, the return fan draws air form each zone and a portion of that air is recirculated back to the supply fan inlet via the return damper. In a system such as this, when more outside air must be brought into the building, the return air flow will be proportionally decreased. Thus, there is an inverse relationship between outside air and return air flow levels. However, there is generally a direct relationship between outside air intake levels and the building exhaust airflow with a mixed air system. With systems like this, the building exhaust will be balanced against the outside air intake to ensure good building pressurization. Often times, the building exhaust will be set to a slightly lower flow rate than the outside air intake to ensure that the building is positively pressurized. The air returned by a system like this should only be from Class 1 spaces (such as general office space), as air form higher risk zones (Class 2, 3, and 4) should not be recirculated in accordance with ASHRAE guidelines. However, ASHRAE does permit air supplied from a mixed air system to also supply air to more critical spaces, such as Class 2, 3, and 4 spaces. For example, the supply air in FIG. 1 could be used as ventilation for a laboratory space. It would not be permissible however to recirculate the air from that lab.

FIG. 2 is a generalized illustration of a typical prior art ventilation system used with labs and other critical spaces. For simplicity, excluding corridor 217, only four zones (1B, 2B, 3B, and 4B) are depicted in FIG. 2, although those experienced in the art of lab ventilation will appreciate that such systems may serve many more locations than that shown and in some cases less. Note that devices (201 and 219) called venturi valves (also called "valves") are shown instead of dampers to control supply and exhaust air because of their common use in labs; however, this description applies to any flow control devices used in the art. Systems such as this are commonly referred to as 100% outside air systems because the supply fan (202) in this case only draws air from outside the building and does not incorporate mixed air. As previously stated, ASHRAE does permit the supply of mixed air to critical spaces. However, if most or all of the zones, such as zones 1B, 2B, 3B and 4B in FIG. 2 are classified as Class 2, 3, or 4 spaces, all of the air exhausted from these spaces via 204, 205, 207, 208, and 211) has to be conveyed by the exhaust fan 203 and discharged from the building and none of this air can be recirculated or distributed to the other locations. It's actually common practice to even incorporate air from Class 1 spaces with lab exhaust to avoid the cost of having to install and operate two different fan systems. FIG. 2 also illustrates another common aspect of many conventional lab systems which incorporate office space, such as zone 3B. In zone 3B of FIG. 2, only supply air 210 is provided to the office space and this results in airflow 215 between zone 3B and 2B that is equivalent to that supplied to the office location. This practice helps to reduce the number of exhaust valves 201 or dampers that need to be installed, which reduces cost and complexity. Given that zone 3B has been defined as office space, it is essentially a Class 1 environment and therefore the air flowing from zone 3B to zone 2B can be considered to be relatively free of contaminates and can help to dilute any contaminants that may be present in zone 2B.

In addition, each of the zones 1B, 2B, and 4B in FIG. 2 are connected to a common corridor 217 and the corridor would also normally be considered to be a Class 1 environment. Therefore, the air which flows from the common corridor into each space also provides some dilution to contaminants which may be present in the critical lab zones. The flow of air from one contiguous location to another is often referred to in the art as "room offset". Typically, room offset (often called volumetric offset) is a design parameter used to establish the pressurization of one zone in relation to that of another. The volumetric offset is often calculated as the difference between the total air that is mechanically supplied to a space subtracted from the total air that is mechanically exhausted from the space. Therefore, as an example, if 500 cubic feet per minute (CFM) is supplied (206) to zone 1B and 200 CFM is exhausted through the fume hood (205) in that space and 400 CFM is removed through the general exhaust (204) in that space, the volumetric offset in zone 1B (213) will be −100 CFM. Therefore, in this example, zone 1B will be negatively pressurized with respect to the corridor and air (213) will flow at a rate of 100 CFM from the corridor to zone 1B. Labs are often configured to operate with a negative offset to prevent contaminants that might be released from a chemical spill within the lab from spreading to other locations.

As is known in the art, fume hoods (such as 205 and 208) are often incorporated within labs to allow lab personnel to safely conduct work, such as experimentation, with compounds that may pose a health hazard or present an objectionable odor or sensory irritation. Fume hoods are normally setup to draw at least some minimum level of airflow from a given lab space in order to ensure that any spill of contaminants, such as chemical compounds, within the hood cannot travel into the lab or expose personnel working at the hood. It is common practice to vary the amount of airflow drawn into the hood as a function of the hood sash opening, using variable volume controls. U.S Pat. No. 4,706,553, incorporated herein, is an example of the intricate operation of a variable volume fume hood controller. U.S. Pat. Nos. 4,893,551 and 6,137,403, which are also incorporated herein, are examples of fume hood sash sensing approaches used to vary fume hood air flow rates with sash opening. Any number of fume hoods may be present within a laboratory and, the amount of airflow exhausted through a fume hood will generally vary with the size of the hood and its sash position. Fume hoods are generally considered as Class 4 environments, as described by ASHRAE 62.1-2016.

Although fume hoods will at times exhaust airborne contaminants into an exhaust plenum (such as 220) at concentrations that would be unhealthy or objectionable for lab occupants to breath, most of the time the air flowing from a fume hood into the exhaust system will be relatively clean. This in part is due to the fact that most fume hoods are not under continuous use by lab personnel. Nevertheless, there will normally be some continuous amount of airflow through most fume hoods (such as 205 and 208), based upon guidelines provided by ANSI Z9.5-2012.

The general exhaust (such as 204, 207, and 211) is provided in labs in order to ensure the desired lab pressurization and to provide an exhaust path for contaminant spills that may take place in the lab. As with fume hood controls, the air flow controls for each lab space may operate either as what's known in the art as constant volume systems or variable volume systems. When the flow controls include exhaust and supply airflow devices such as 201 and 219 that have fixed flow settings, those experienced in the art of lab ventilation would recognize that the airflow system would be referred to as a constant volume system. Constant volume systems are generally less energy efficient than variable volume systems, as they tend to apply more ventilation to a given lab space than is necessary because they must be fixed to deliver the worst-case ventilation needs.

Those experienced with laboratory ventilation controls will appreciate that most ventilation control strategies are designed to satisfy the relationship of Equation 1 below.

Lab Supply CFM=General Exhaust CFM+Fume Hood CFM+Volume Offset  (Equation 1):

There are many ways to satisfy the ventilation balance of Equation 1 and in the art, the control strategy varies based on the manufacturer of the ventilation control system and the preferences of the specifying engineer. In some cases, such as with room and lab environments that are tightly sealed the volume offset may be actively varied in order to control the pressure of the room or lab space based upon a predetermined pressure setpoint. U.S. Pat. No. 5,385,505 A, incorporated herein, describes a pressure maintenance system for substantially sealed spaces.

Unless there are chemical spills or the lab chemical handling protocol and hygiene is poor, the air quality in labs is generally quite good. This is due to the fact that ventilation rates in labs are generally much higher than that of less critical environments, such as office spaces and other Class 1 spaces. As is known in the art, a figure of merit which is used to describe ventilation levels is "air change rate", which is often measured as air changes per hour or ACH. This is a measure of the number of times per hour the air in a room is fully replaced or exchanged with fresh new air. Over recent years, there has been a trend in the Heating, Ventilation, and Air Conditioning (HVAC) community to decrease air change rates within laboratory environments and other critical spaces. For example, in the 1990s it was quite common to specify air change rates of 12 ACH or higher in labs. Historically, it was also common to specify 18 ACH or more in animal facilities or vivariums. One influence on this tendency is that ANSI Z9.5-2012 states that " . . . air changes per hour is not the appropriate concept for designing contaminant control systems." A guideline for animal facilities that is frequently referenced is the Guide for the Care and Use of Laboratory Animals by the Institute for Laboratory Animal Research (ILAR) which states that a "Provision of 10 to 15 fresh air changes is an acceptable guideline" but that the "use of such a broad guideline (for animal rooms) might over-ventilate a macro-environment containing few animals . . . "

Another factor which has resulted in reduced air changes in critical environments, such as labs, is that the thermal loads in many of today's labs are quite low in comparison to what they were 10 to 15 years ago. One influence on this is the use of higher efficiency lighting in labs, such as LEDbased lighting technology. Also, personal computers that are used in labs now have energy efficient LCD screens, which use only a fraction of the power of the older CRT-based monitors. More energy efficient technologies such as these have significantly reduced the amount of added heat given off by equipment in the lab space. This results in a lower overall wattage per square foot of equipment related heat gain in the lab space, thereby reducing the cooling requirements for these spaces. For example, it used to be common for labs to be designed with a thermal cooling load of 10 watts per square foot or higher. Now, most labs operate at 3 watts per square foot or less. Lab supply air flow rates are commonly used to handle the labs cooling load. As the lab cooling load is reduced, the supply air flow requirements also reduce.

Today, it is quite common for engineers to specify 6 ACH for occupied hours in labs and as little as 2 ACH during unoccupied hours. With the application of an active monitoring system used to sense for lab contaminants, it has also become common to specify 4 ACH during occupied hours in labs. U.S. Pat. No. 6,425,297, which is incorporated herein by reference, describes a system that can be used for such room level monitoring purposes. Also, in animal rooms today engineers are specifying air change rates of 10 ACH or less.

In a 2017 ASHRAE Technology Award Case Study [ASHRAE Journal, July 2017], incorporated by reference herein, Crowley describes substantial flow reduction energy conservation measures that include the application of active chilled beams. Those experienced in the art recognize that chilled beams or radiant cooling coils utilize chilled water and not air to remove heat from the room. Chilled beams are radiator like coils through which chilled water is flowed in order to provide a chilled surface that is usually located in the room's ceiling. Because of the relatively cool surface, convective airflow is established in the space as relatively warm room air rises to the ceiling-mounted coil. The cool air that emanates from the coil has a downward flow that acts as a mechanism to convey cool air to room occupants. The use of chilled beam technology has become prevalent in lab and non-lab buildings alike and helps to reduce the amount of supply air needed in a space for cooling purposes.

Even though there has been a trend for reductions in lab ventilation rates, air quality in most labs and other critical environments tends to be very good with few airborne contaminants in the lab space the majority of the time. In an ASHRAE Journal article "Demand-Based Control of Lab Air Change Rates" [Sharp, ASHRAE Journal, February 2010], incorporated herein, Sharp presents data representing a large number of labs taken over 1.5 million hours of operation. The data shows that the labs of this study were relatively free from contaminants more than 99% of the time.

Exhaust fan 203 is used to convey the air through each exhaust control device (201) and expel the air from the building. In its operation, exhaust fan 203 must have the capacity to draw the required airflow through each of 201. The combined exhaust of every zone (1B, 2B, 4B) is herein referred to as the "Total System Exhaust" (221), which is the total amount of air that needs to be drawn from the building locations served by fan 203. As is known in the art, in practice the total system exhaust 221 may be composed of exhaust air from any number of zones and may differ considerably from the example of FIG. 2. Also, because of variable air volume (VAV) zones the total system exhaust 221 may vary by a considerable amount, due to VAV fume hood use and variations to the ventilation rates in each zone that may result from flow levels required for temperature control, as well as a number of variables that may prompt dynamic changes to each zone's minimum ventilation rate. For example, it is common practice to operate a lab zone at one air change rate (for example, 2 ACH) during unoccupied hours and another air change rate (for example 6 ACH) during occupied hours. In all cases, the exhaust fan 203 must provide enough negative pressure to the exhaust plenum (220) and across exhaust devices 201 to ensure that the desired exhaust air flow is maintained at each zone under all conditions.

Another important function of exhaust fan 203 is to expel the total system exhaust 221 at a sufficient rate to ensure that any possible contaminants within 221 are properly dispersed into the outdoor atmosphere so that these contaminants will not be entrained into locations within the building envelope (such as outside air intakes for example) or expose locations of neighboring buildings. In older ventilation system designs (those implemented before the 1990's for example) it was quite common to ensure good dispersion of contaminants into the atmosphere by constructing a very tall exhaust stack on the building to which fan 203 would connect. These stacks would often reach heights of 30 to 40 feet, or higher, above the roof of the building, in order to ensure good dispersion performance of potential contaminants. The problem with structures such as this is that they are an esthetically unpleasing component of the building's architecture, because of their size and the guy wires and other mechanical framework needed to support these structures. Also, because of the guy wires needed to support these stacks, it can be difficult to erect multiple stacks such as this on roofs with limited space.

A popular alternative to the use of the aforementioned large exhaust stack has been high plume exhaust fans or high plume dilution fans, herein referred to as high plume fans. High plume fans provide a way to create an effective stack height that is many times the actual physical height of the fan stack. This is accomplished using a nozzle design that is integrated with the outlet of the fan which increases the discharge or exit velocity of the exhaust flow. High plume fans also may incorporate a bypass airflow control element which introduces quantities of outdoor air with the total system exhaust flow (221) to ensure that a target fan exit velocity is maintained by the fan system at all times. The bypass air will vary inversely with the total system exhaust flow, which results in a constant total airflow at the fan's outlet. Using a high plume fan enables the fan to be relatively concealed, as the physical height of this type of exhaust stack system is typically only 10 to 15 feet in height.

U.S. Pat. No. 4,806,076, which is incorporated herein by reference describes an early high plume fan design, which resembles many of the fan systems used today. Examples of commercially available high plume fan products include but are not limited to: Tri-Stack® by Strobic Air Technologies, Axijet® by M.K. Plastics Corporation, and Vektor® series fans by Greenheck Inc.; brochures for each are incorporated herein. These are just examples of products which are commonly seen in use; those who are experienced in the art of ventilation systems will appreciate that there are a wide range of high plume fans made by numerous manufacturers.

FIG. 3A further illustrates the operation of a typical prior art high plume fan system 300A, that may be used as exhaust fan 203. The system 300A includes three discrete fans (309, 310, and 311) which have been manifolded together into one common plenum 307. Note that any number of fans can be utilized in a high plume fan assembly but that three fans are shown in FIG. 3A for illustrative purposes.

A feature that is common with most types of high plume fans is the nozzle and wind band assembly 313. As is known to those familiar with ventilation systems, a wind band provides protection to the exit nozzle from wind and weather conditions and it also will entrain added airflow 318. Airflow 318 is also often referred to as dilution air since it contributes to the overall dilution performance of the exhaust fan 203.

It is also common practice to incorporate a backup fan in systems such as 300A, given the critical nature of the operation of these systems. When a backup fan is incorporated, as one active fan fails, fan system 300A operation will be maintained by activating the backup fan and taking the failed fan offline. For example, fan 300A could be configured with one of the three fans serving as backup. One of the features incorporated with most fan systems such as 300A is that they often incorporate shut off dampers 308. The purpose for the shutoff damper assigned to each fan (309, 310, and 311) is to provide a way to take a fan offline or to provide a way to enable a fan to serve as a backup. For example, if fan 309 serves as backup to system 300A, its shutoff damper 308 will be closed so that no air is allowed to flow through fan 309 when it is not running. During this time, the shutoff dampers to the fans which are running (310 and 311) will be open so that air can flow from plenum 307 into 310 and 311 and then the 312 discharge air. It is also common practice for an exhaust fan assembly 300A to periodically change which fans are active and which fan serves as the backup fan. For example, during one period of time fan 309 may serve as the backup, with fans 310 and 311 serving as the active fans. During another period of time, fan 310 may serve as backup with fans 309 and 311 serving as the backup; and so on. This strategy of rotating the backup fan is known in the art as a "lead-lag" sequence, and it serves as a way to ensure that each fan ages in a uniform manner. The lead-lag term refers to the method used to determine which fan will be shut off to serve as backup, as the backup fan is made active. The strategy designates the fan which has been on for the longest period of time as the one which will next become the backup fan. This rotation or change to which fan may serve as backup normally happens every few days and is usually a parameter that is programmed into the control logic for 300A. One practical issue that sometimes results in cold climates with the lead-lag function is that the shutoff damper 308 on the backup fan can become frozen due to ice buildup. When this occurs, as the fan system 300A initiates the lead-lag function it can result in a compromise in the flow delivery 312, due to the fact that no airflow will result from the fan being activated. As a result, in colder climates where there may be ice and snow buildup, it is not uncommon to eliminate the lead-lag function during the winter months. However, that does detract from the uniformity with which the fan systems will age, resulting in early failures in some fan components such as bearings for example.

FIG. 3A also illustrates the connection of four duct risers (302, 303, 304, and 305). With exhaust systems it is quite common to have a number of duct risers which run vertically through the building to connect various locations. For example, it's common to have a separate vertical exhaust riser per floor or ones that interconnect different wings of a building. It would be apparent to those skilled in the art of ventilation systems that any number of risers could connect to plenum 307. In some cases, for example, there will be one exhaust riser that may connect one or more manifolded ducts on one or a plurality of floors in the building. However, the configuration of a plurality of risers as shown in FIG. 3A is quite common. Also, it is common practice to interconnect any number of exhaust risers to a common plenum 307 in the mechanical space or penthouse that is located just below the roof 306.

In a typical system bypass air 301 is mixed with the total system exhaust (221) which for 300A would be the combination of exhausts 314, 315, 316, and 317. Bypass flow 301 is adjusted until the desired exit velocity of 312 is achieved. In many applications today, it is common to set this exit velocity to 3000 feet per minute. An exit velocity of 3000 feet per minute (fpm) is often specified based on guidance from ANSI Z9.5-2012. However, the ANSI standard specifically states that 3000 fpm "is required unless it can be demonstrated that a specific design meets the dilution criteria necessary to reduce the concentration of hazardous materials in the exhaust to safe levels . . . "

There are several common ways in which the fan system 300A will be controlled. Usually, the active fans (the ones which are not selected to be in backup or standby mode) will be set to operate at a fixed speed so that each active fan will be able to deliver the desired exit velocity (for example 3000 fpm). In most cases, the control of the bypass air 301 will vary inversely with the Total System Exhaust (221). The most common way to control bypass 301 is by controlling a modulating damper to vary 301 in order to maintain a fixed static pressure setpoint within plenum 307. For example, the bypass 301 may be varied to control the static pressure to −4 inches of water column (inches $H_2O$), but setpoints in different applications may vary considerably. FIG. 3A shows a bypass inlet and damper assembly 301 on each side of exhaust fan system 300A; however, in some cases there will be only one main inlet 301. In other cases, there may be a plurality of bypass inlets 301. The total airflow exiting an exhaust fan system is a function of fan speed. In some applications, fan speed is established by what's known in the art as sheave settings on the fan assembly. In other cases where the total system exhaust 221 may vary considerably, the exhaust fan speed will be controlled by way of a setpoint to one or more variable speed drives (VFD's). VFD use is quite common with high plume exhaust fan systems because it provides an efficient way to control the power to the exhaust fan motors. Typically, each fan (309, 310, 311) will have a dedicated VFD.

In many high plume fan applications, it is quite common for the bypass airflow 301 drawn into the exhaust fan system 300A to be a substantial portion of the overall outlet airflow 312. This is especially the case when measures have been taken to reduce the total system exhaust CFM (221). For example, as previously described, it has become quite common to operate critical spaces such as labs at 6 ACH during occupied hours and 2 ACH during unoccupied hours. There has been an increasing trend to implement such settings as an energy conservation measure (ECM) in existing labs which may have previously been operating at much higher minimum air change rates (for example 12 ACH or higher). In buildings with high plume exhaust fan systems such as 300A, most of the energy savings that results from lab flow reduction ECM's is associated with supply airflow energy savings, as the reduction in airflow from supply fan 202 results in lower supply fan energy use and there is also significant heating and cooling energy savings due to the reduction in the amount of outside air that needs to be brought into the building. On the exhaust side, however, as flows are reduced in the lab only the total system exhaust CFM (221) is reduced and not necessarily the outlet airflow of the exhaust fan 312. With a system such as 300A, as the total system exhaust CFM (221) is lowered the bypass air 301 will proportionally be increased in order to maintain a constant outlet flow 312. As a result, there may be no energy savings realized in the operation of exhaust fan system 300B with the flow reduction ECM. In practice, there will usually be some exhaust fan energy savings with 300A as a result of a lab flow reduction ECM if the exhaust fans 309, 310, 311 are staged or as a result of reduced peak exhaust flows. Fan staging provides a way to save energy by reducing the number of active fans from 300A when the total system exhaust CFM (221) is at a level where few fans can safely handle that flow rate 221 while also operating at the desired outlet velocity (for example 3000 fpm). One of the problems with active staging of fans is that, similar to Lead-Lag operation, during winter months reliability issues can be encountered when attempting to turn fans on and off, due to the shut off damper 308 icing up. Therefore, in many of the colder climates in the world fan staging is not implemented.

Table 1 below illustrates the operation of an exhaust fan system 300A as the lab ventilation rate in an example building are reduced. Table 1 assumes a scenario where a building initially had spaces which on average operated at 12 ACH and, through a flow reduction ECM, now operate at 6 ACH on average. This building could have spaces that resemble those illustrated in FIG. 2. For this example, however, the total system exhaust values shown in Table 1 are more representative of a larger facility, which is also more typical. As one can see from Table 1, when the average air change rate is 12 ACH in each location, the total system exhaust is 36,000 CFM. In that state, 16,000 CFM is brought into the plenum 307 as bypass air 301. Assuming that two of the three fans are active, 52,000 CFM of exhaust fan total CFM 312 is required in order to establish an exit velocity of 3,000 fpm at each fan. This is based on the cross-sectional area of the outlet nozzle on fan in 300A. Those experienced in the art of ventilation systems will appreciate that actual fan geometries along with the room flow rates will vary considerably in practice and that the values here are specific only to this example. As the room air change rates are reduced to 6 ACH, the total system exhaust CFM will reduce to 18,000 CFM as shown in Table 1. Table 1 considers two prior art scenarios of how the exhaust fans 300A may be adjusted as the room air change rates are reduced to 6 ACH. This includes a non-staged fan strategy and strategy where the fans are staged. Again, in this example we assume that a maximum of only two fans of 300A are running to handle the total system exhaust CFM. In the non-staged scenario, as the total system exhaust CFM is reduced to 18,000 CFM (due to ventilation rates being reduced to 6 ACH) two fans will continue to operate and therefore the exhaust fan total CFM will continue to be 52,000 CFM. This means that 34,000 CFM of bypass air 301 needs to be added to the total system exhaust CFM 221 in order to maintain an exit velocity of 3000 fpm. With the staged fan scenario, because one fan will have enough capacity to handle the lower total system exhaust CFM 221, one of the two active fans in 300 will be shut off. In this example, two fans deliver 52,000 CFM, so one fan will deliver 26,000 CFM. In this scenario, 8,000 CFM of bypass air 301 must be combined with the 18,000 CFM of total system exhaust in order to deliver 26,000 CFM of exhaust fan total CFM, which is required to maintain an exit velocity of 3,000 fpm. Table 1 illustrates an aspect of these systems 300A in that the bypass CFM values 301 will often be a large percentage of the exhaust fan total CFM.

TABLE 1

Exhaust Fan Airflow with Ventilation Reduction ECM (Prior-Art)

| Average Room ACH | Total System Exhaust CFM | Exhaust Fan Total CFM | Bypass Air CFM |
|---|---|---|---|
| 12 | 36,000 | 52,000 | 16,000 |
| 6 (non-staged) | 18,000 | 52,000 | 34,000 |
| 6 (staged) | 18,000 | 26,000 | 8,000 |

Bypass airflow 301 values can be quite large, even when fans are staged. Because of this, high plume exhaust fan systems utilize a lot of energy and can be quite expensive to operate. In the example of a non-staged fan shown in Table 1, the bypass air 301 represent 65% of the exhaust fan total CFM. Even for an efficiently operating fan, the amount of power required per CFM could easily be 0.7 Watts/CFM. At this rate it could require over 208,000 kilowatt hours (kWh) of electricity on an annual basis, just to operate the bypass air 301 portion of the fan system 300A. If for example the cost per kWh is $0.11 per kWh, this translates to over $22,880 just to run the bypass air, annually.

Although a fan exit velocity of 3000 fpm will often be specified, in some cases even higher fan exit velocities will be specified because of a number of reasons that include but are not limited to: anticipated characteristics of the exhaust dispersion plume due to ambient wind speed and direction, physical structures (such as other buildings for example) which are in proximity to the exhaust fan system 300A, and the unique dilution requirements due to usage quantities of the chemical inventory. This will further increase energy use as, to achieve higher exit velocities more bypass air 301 will generally be required.

Another factor associated with the exhaust fan system 300A performance is that, as the exit velocity of fan 300A is increased, acoustical noise within the human audible range can become a factor with these systems. Many of the world's research facilities which may incorporate labs and high plume exhaust fans are located in metropolitan areas, including inner-city locations where strict noise threshold limitations may be implemented due to close building proximities. Running fan systems 300A at higher than necessary exit velocities can also result in higher radiated noise levels or sound pressure levels which will add to overall sound pressure levels emitted from the building, which can become a factor in meeting local noise regulations.

Although the exhaust fan system 300A represents a configuration of the general fan system 203, those familiar with the art of ventilation controls will recognize that a wide range of exhaust fan system configurations exist which do not utilize high plume fans. High plume fan use has become very popular, but many systems exist and continue to be specified which include fans other than the high plume style. FIG. 3B illustrates an example of this, where a fan 323 is connected through an optional duct 322 to plenum 307, to exhaust air 314, 315, 316, and 317 which comingles in plenum 307. The fan 323 discharges into stack 321 and this discharged air exits through nozzle 320. Moisture which may accumulate in stack 321 due to rain or condensation will drain through drain element 324. Those familiar with the art of ventilation controls will realize that the fan configuration of 300B is just one example of a wide range of exhaust fan configurations which is based on an approach which does not incorporate one or more high plume fans. For example, a common configuration includes but is not limited to centrifugal blowers that do not have an integrated wind band 313. The fan element 323 may also be an axial fan, a forward inclined fan, a reverse inclined fan, or any of a broad range of fan types that are known to those experienced in the art of ventilation controls. The fan implementation 300B may also incorporate a bypass air element in a manner that is like 301 that's illustrated in 300A. Similar to system 300A, which incorporates one or a plurality of fans (309, 310, 311), system 300B may incorporate one or a plurality of fans 323. Usually, when there are more than one fans 323, each additional fan 323 will also be configured with a dedicated stack 321 and nozzle 320. As is known in the art, there are some conditions where more than one fan 323 will be connected to a common stack 321 and nozzle 312; this approach can be used to boost the exit velocity of discharge air 312 which can be beneficial to improving the plume height and dispersive properties of the system 300B. As is the case with the fan configuration of system 300A, depending on the requirements of the application, system 300B may also be configured with any combination of numbers of risers and numbers of fans. In some cases, such as when there is only one riser (for example riser 302), plenum 307 may be reduced in size so that it is primarily the size of duct 322. Assuming there is a bypass element 301, this will often be implemented in a manner that is similar to that described for system 300A.

Methods of reducing high plume exhaust fan energy use has been a topic which has received a lot of attention by the HVAC engineering community over recent years. One approach to lowering high plume fan energy use that has been tried has been to incorporate active environmental sensing of contaminants within the total system exhaust 221. This approach, herein referred to as exhaust demand control (also referred to in the art as "exhaust fan control"), has the objective of operating the exhaust fan system 300A at two different potential exit velocities based on whether contaminants are detected in the exhaust stream 221 or not. If contaminants are detected, then the fan system 300A would be commanded to operate at a higher exit velocity (such as 3000 fpm or higher). If on the other hand the exhaust stream 221 is determined to be relatively clean, the fan system 300A would be commanded to operate at a lower exit velocity, such as a value as low as 750 fpm or another suitable exit velocity. Exhaust demand control may be applied to non-high plume fan systems as well, such as system 300B. Serious issues with contaminant sensing, as described further below, have prevented exhaust demand control from working effectively.

In an ASHRAE Journal article "Saving Energy in Lab Exhaust Systems" [Carter et al., ASHRAE Journal, June 2011], incorporated herein, methods are presented to vary exhaust exit velocities based on whether the exhaust stream is relatively free of contaminants using a chemical monitoring system. Wind velocity measurement is also reviewed as an added approach. Wind velocity has an inverse influence on the effective stack height of a system 300A or 300B which reduces the dispersion of contaminants as windspeed is increased. The concept is to therefore monitor windspeed (using an anemometer for example) and to save fan energy by reducing exhaust exit velocities during non-windy times. Windspeed monitoring by itself however yields only a very limited savings as exit velocities of 3000 fpm or more may still be required when exhaust air contains contaminants.

FIG. 4 illustrates two prior art approaches which have been implemented to detect contaminants in the total system exhaust 221. One approach involves monitoring the total system exhaust with one or more discrete sensors 401, which are disposed within the common plenum 307 to which the air from each exhaust riser 314, 315, 316, and 317 will comingle. In this application, sensor 401 communicates its reading to either the fan controls or the building automation system (BAS) that communicates with the fan controls. Logic may be setup either within the sensor 401 electronics or within the BAS or fan controls to determine when the fan system 300A/300B can operate at a lower exit velocity or when it must operate at a pre-determined higher velocity.

The sensor that is typically used for 401 is known in the art as a photoionization detector or PID. PIDs are used extensively for a variety of environmental health and safety applications because of their ability to detect hundreds of different compounds and especially volatile organic compounds (VOCs). A PID can also detect a limited number of inorganic compounds as well. Volatile organic compounds are of special interest to applications such as 400 because a large percentage of the chemical inventory that is used in labs and other critical environments which require the most amount of dilution or dispersion from the exhaust fan system are VOCs. U.S. Pat. No. 6,646,444, which is incorporated herein, describes an exemplary PID used in systems such as multiplexed air sampling systems.

One characteristic of a photoionization detector is that it is that it is able to provide a signal that is simultaneously responsive to multiple compounds. This is sometimes referred to as a "broadband" sensing characteristic. Other types of broadband sensors include but are not limited to metal oxide semiconductor (MOS) sensors, flame ionization detectors, and total organic compound (TOC) infrared sensors. With a PID, the photoionization occurs as a molecule absorbs a photon of energy at a sufficient level to release an electron to create a positive ion. This takes place when the ionization potential of the molecule in electron volts (eV) is less than the energy of the photon. A PID uses a specialized ultraviolet lamp as its photonic source. It is common to use PIDs with lamps which operate at 10.6 eV, as these lamps tend to be reasonably durable for detecting compounds in most occupant environments while also providing a broad detection range. As a compound is ionized by the lamp, electron flow is measured by a detector electrode, and this current is proportional to the concentration of the gas that has been ionized. Different compounds can be ionized at a given time, allowing the sensor to be responsive to concentrations of multiple compounds. A PID is also a very sensitive device which, when used in relatively clean environments, can reliably detect many compounds at concentrations of a few tens of parts per billion.

A PID has different sensitivities to different compounds. This is known in the art as a response factor or "RF". Often times a PID will be calibrated on a specific gas, such as isobutylene for example, and the response factor of the PID to a particular compound will be referenced to its response to isobutylene. Response factors will vary slightly from one PID design to another. For example, a typical PID response factor for acetic acid is 11. This means that the PID's response to 1 part per million (ppm) of isobutylene is 11 times that of its response to 1 ppm of acetic acid. Therefore, when such a PID is exposed to 1 ppm of acetic acid, it will read 0.09 ppm in units of isobutylene. In the art, this would be described as a reading of "0.09 ppm as isobutylene". A response factor influences the sensor's ability to detect a compound at a given threshold. Detection will be most limited for compounds which have a combination of very low TLV or odor thresholds and very high response factors. In the case of acetic acid, which has an odor threshold of 0.016 ppm, it would not likely be detected by the PID in this example at its odor threshold, because this would be a reading of (0.016 ppm/11) 0.0014 ppm as isobutylene, which is beyond the resolution of most PIDs. When applied in conjunction with an exhaust fan monitoring application however assume for example that PID 401 is used to detect against a contaminant threshold of 0.4 ppm as isobutylene. In this case, when exposed to enough acetic acid to produce a reading of 0.4 ppm as isobutylene 4.4 ppm of acetic acid will be present at the sensor location of 401 in plenum 307. In order to ensure that the odor of acetic acid will not be present at a receptor point around the building, the exhaust fan system 400 will have to provide 275:1 dilution. This is usually achievable even at lower fan exit velocities.

The use of sensor 401 to monitor for exhaust contaminants has several drawbacks. First, it is often the case that the exhaust air 314, 315, 316, and 317 does not mix in a uniform manner within plenum 307. This often results in different contaminant concentrations being exhausted by each fan (309, 310, and 311). As a result, there often is no single good location within 307 to apply a sensor 401 which would yield a contaminant measurement that's sufficient to ensure fan exit velocities are properly regulated. For example, sensor 401 may be placed on one side of the plenum near Riser 1 (302) as shown, however, this may not be sufficient to detect contaminants traveling through Riser 4 (305). This is especially the case if only fans 309 and 311 are active, in which case, contaminants in Riser 4 may not be detected at all, as the flow 317 travels straight through plenum 307, directly into intake 308 and through fan 311. In such a scenario, a potentially dangerous condition would result in which the fan system 400 would continue to operate as a lower exit velocity in which contaminants may not sufficiently be dispersed from the building exhaust. This can result in entrainment of contaminants at unhealthy levels into building ventilation intakes or to other sensitive outdoor receptor locations.

Another factor which can make the use of sensor 401 unreliable is that, at times sensor 401 may be exposed to very high concentrations for extended periods (many hours in some cases) and this has a tendency to foul the sensor. Note that even though exhaust air such as 221 is often quite clean, at times it may in fact be quite rich with contaminants. This for example could occur during some period of time during portions of the week in which fume hood use is prevalent. Sensor fouling is especially an issue with PID's when for example their lamp is exposed to high contaminant concentrations that can result in the buildup of a contaminant film that alters the lamp's UV output intensity, often resulting in a sharp decrease in the sensor's sensitivity. The end result is that, even after a few days of exposure, sensor 401's ability to detect compounds with sufficient sensitivity will be compromised. PID's and most other sensors are not designed for constant exposure to the high concentration of compounds which at times will be present from the Class 4 exhaust air that flows from fume hoods and other exhaust sources into total system exhaust 221.

FIG. 4 also illustrates an alternative prior art method of detecting concentrations of contaminants in the exhaust air 221, using sensor 402, which is integrated within a type of multipoint air sampling system known as a networked air sampling system. Sensor 402 will at least comprise a PID, but may also include other sensors including a sensor to measure airborne particulate matter and a metal oxide semiconductor (MOS) sensor for measuring some VOC's, such as methyl alcohol which the PID cannot sense. The prior art system shown incorporates a sensor suite 403, an air router (411) and four sampling locations 414, 417, 420, and 423. It should be clear that this example only uses four risers but that the multipoint air sampling system could be adapted to monitor more locations if necessary. The multipoint air sampling system shown in FIG. 4 is described in U.S. Pat. No. 6,425,297 B1, which is incorporated herein. Using this system, air samples are conveyed to 402 through a common backbone tubing 409, which is connected to the riser locations 302, 303, 304, and 305 through valves 412, 415, 418, and 421 housed within Air Router 411. Air samples are drawn to Air Router 411 through duct probes 414, 417, 420, and 423 via tubing 413, 416, 419, and 422 in a sequential manner in order to obtain discrete measurements of each location 302, 303, 304, and 305 in a time-multiplexed manner. The sampling sequence is commanded via a centralized server (427) that may communicate with a plurality of Sensor Suites 403 measuring different locations in the building. Sensor Suite 403 communicates with one or more Air Routers 411 via a communications network 408 to instruct 411 of which valve 412, 415, 418, and 421 should be open at a given time in order to facilitate an air sample. Air samples are drawn through the Air Router 411 and Sensor Suite 403 via a vacuum pump 404. Control logic within Information Management Server 427 compares the contaminant level sensed by 402 against a pre-determined threshold in order to establish whether or not the fan system should operate at reduced exit velocities or not. When a PID sensor is used, it is common to set this threshold to between 0.2 and 1 ppm as isobutylene. This information is communicated either directly to the fan system or through the BAS via network 424. In many cases network connection 424 will be a BACnet network connection, such as BACnet/IP. Those who are experienced with HVAC control systems will recognize that BACnet is a universal networking and communication protocol that was established by ASHRAE in order to enable different systems to communicate without the need for a proprietary network protocol. Also, not shown in FIG. 4, Air Router 411 has the ability to support analog signal connections to other systems. This includes the ability to provide a relay contact which may be monitored by another system in order to convey a binary or two-state condition. This and other signals (also, generally known in the art as I/O) can be provided through the Air Router 411, which could directly connect to the controls which operate fans 309, 310, and 311. Thus, logic that runs on Information Management Server 427 will determine whether the fans need to operate at high or low exit velocities based upon whether contaminants have been detected in each of the risers or not, in order to create an "enable" signal which can either be communicated through the Sensor Suite 403 to I/O on the Air Router 411 or the enable signal can be communicated via 424 over BACnet to the BAS or fan controls.

Information Management Server 427 also has the ability to communicate contaminant levels sensed by sensor 402 to a remote data center 426 via an internet connection 425. In addition, basic diagnostic information on the operation of sensor suite 403 is provided through this internet connection 425 to the data center 426 in order to be able to remotely monitor overall system health.

Using a multipoint air sampling system in conjunction with sensor 402 has the advantage of enabling the detection of contaminants in exhausts 314, 315, 316, and 317 before they comingle in plenum 307. This enables the detection logic (which may be setup in Information Management Server 427) to discriminate at a higher threshold or contaminant concentration than would be possible by monitoring only one point in plenum 307. Detection that's based upon measurements taken from the individual risers 302, 303, 304, and 305 can provide an extra margin of safety and sensor noise rejection by taking advantage of the internal dilution provided by the total system exhaust.

The internal dilution of the exhaust system 400 is a factor that can vary considerably depending on how much total system exhaust CFM there is in comparison to a contaminant source's CFM, such as that of a fume hood. In most facilities the dilution level that may be provided to a chemical spill within a fume hood could easily be a factor of 30 or more. This internal dilution component lessons that amount of dilution that the exhaust fan needs to provide. For most chemical inventories, 3000:1 dilution from the exhaust system (including internal dilution and dilution from the fan system) is usually more than sufficient. There are exceptions to this; however, these are usually identified when a dispersion and chemical inventory analysis is performed. With an internal dilution of 30:1, the exhaust fan needs to deliver as much as 100:1 dilution. Most fan systems can easily provide such dilution, even at exit velocities which are less than 3000 fpm.

Similar to the issue with sensor 401, even though the contaminant concentrations in risers 302, 303, 304, and 305 will typically be low, in most facilities (especially one's with fume hoods) it is common to encounter high concentrations of contaminants in the exhaust streams for periods of time throughout a given week. This has the tendency of fouling the sensor 402. This is especially the case as the concentrations seen in each riser will be far higher than that seen in the plenum 307. Airborne contaminants within the exhaust in each riser 302, 303, 304, and 305 can easily reach 50 to 100 times the toxic limit value (TLV) or odor threshold of particular substances. This would often be the case when there is a chemical spill within a fume hood.

A disadvantage that the networked air sampling architecture has when applied to 400 is that the shared backbone 409 tubing tends to adsorb certain compounds such as ones which are highly polar in nature. Those who are experienced with molecular chemistry will appreciate that molecules which are polar in nature have a separation of charge that will cause them to interact with other molecules with dipole-dipole interaction as well as hydrogen bonding. The polarity of a compound can significantly affect the performance of a sample draw system (such as a multipoint air sampling system) that essentially must convey the compound through a tube over some distance. Generally, the longer the tube 409 is, the more intense the adsorption problem will be. Because of adsorption the response of the sensing system can be inhibited in such a way that it can take more time for a complete response to be seen at sensor 402 as a highly polar compound is conveyed through tubing 409. This affect can be exacerbated as alternating clean samples are sequenced through the same tubing 409. This is normally not a problem when applying a networked air sampling system to monitor typical occupant environments (which is what these systems are primarily designed for) because the chemical compounds that are usually found in those environments will be very different than the broad array of compounds that may be used in fume hoods. Risers 302, 303, 304, and 305 will typically contain air from a combination of fume hoods, lab space, and non-lab space.

One characteristic of the networked air sampling system 400 is that it is designed to capture and record a measurement of contaminant concentration for each location 302, 303, 304, and 305 in a deterministic manner and without interruption. Therefore, whether system 400 has indexed the fan outlet velocities to a higher value (for example 3000 fpm) because contaminants have been detected does not alter the sampling sequence of the system.

One measure of a compound's polarity is what's known in the art as dipole moment. Dipole moment is measured in units of Debyes. Generally, a comparison can be made from one compound to another as to the degree to which they may adsorb to tubing media 409 by comparing dipole moment data. Tubing media 409 includes but is not limited to Kynar® and other fluoropolymers. For example, ammonia, which has a dipole moment of 1.47 Debyes, has a high tendency to adsorb to Kynar®. Benzene, which has a dipole moment of 0 Debyes, has very little tendency to adsorb to Kynar®. Other factors come into play which influence compound adsorption, such as what's known in the art of molecular chemistry as van der Waal forces, but measurement of dipole moment can serve as a good indicator of compound adsorption tendencies.

Another disadvantage of the networked air sampling architecture shown in 400 is that it is relatively expensive to implement due to the number of components such as Air Router 411, Sensor Suite 403, and Information Management Server 427 which have to be installed in addition to tubing 409, 422, 419, 416, 413, and network connection 408. The network air sampling architecture is more suitable for monitoring numerous occupant locations in a facility (usually several dozen locations) and can be expensive in terms of material and hardware costs along with installation costs to be justified for use with exhaust demand control applications. FIG. 4 illustrates an application where only four locations 302, 303, 304, and 305 must be monitored. Often times the number of locations to be monitored may be even less, depending on the number of risers. In such cases where few locations need to be monitored in order to implement exhaust demand control, the application of a networked air sampling system would be far too complex and expensive to be practical.

Historically, exhaust demand control sensing methods which either use sensor 402 within a multiplexed air sampling system or discrete sensor 401, have been based upon a continuous monitoring approach. This means that the method 401 or 402 continuously provides sensing, regardless of the contaminant concentration levels that are present in the lab exhaust (314, 315, 316, 317). The continuous monitoring approach results in an exhaust demand control functionality that is often overly responsive when exhaust contaminant levels vary rapidly and by large concentrations. Rapid and pronounced variations in lab exhaust contaminant levels is something that's quite common in many exhaust systems, especially as a result of chemical use in fume hoods. For example, many liquid organic solvents with high vapor pressures are often used in liberal quantities within fume hoods such as 205 and 208 by researchers. Because of these high vapor pressures, these solvents will vaporize readily and in high concentrations, due to spills or intentional releases involved with a process. Solvents may be used for example as a part of a liquid chromatography process, which may result in frequent releases of solvent vapors at high concentrations. Some examples of common high vapor pressure solvents include: toluene, hexane, dimethylformamide, tetrahydrofuran, isopropyl alcohol, ethanol, and many other solvents. Depending on the process, these vapors may be released over intervals as frequent as several minutes or less. Such solvent vapor releases within fume hoods 205 or 208 for example can result in rapid and pronounced variations of solvent concentrations within system exhaust 221 which would be detected by the exhaust demand control sensing method. This can result in oscillations or hunting in the exhaust fan systems 300A or 300B which can affect the flow control stability of exhaust 221 and seriously affect fan 203 and related equipment service life.

Another type of multipoint air sampling system that might be applied to monitor contaminant levels in each riser 302, 303, 304, and 305 is what's known as a star or "hydra" configuration. With this type of system, sequenced air samples from multiple locations are brought to a common panel or suite which contains the sensor(s) and the valves which are used to capture air samples. A star configuration multipoint air sampling system can be similar to aspects of a networked air sampling system, such as that depicted in FIG. 4, in that it incorporates many of the components of a router 411 and sensor suite 403, typically within one enclosure. A star system does not incorporate a backbone tubing 409. Examples of star type systems include but are not limited to the HGM-MZ by Bacharach Inc. and the Multi-Gard™ 5000 by Mine Safety Equipment Inc. These systems incorporate a variety of infrared sensor technologies, such as photoacoustic infrared spectroscopy and various non-dispersive infrared (NDIR) approaches for monitoring, in some cases total organic compound (TOC) content, but usually to target specific refrigerants. TOC sensing such as this generally provides sensing of fewer TVOC parameters than can be detected by a PID sensor. These systems are designed primarily for refrigerant leak detection which involves monitoring occupant breathing zones in buildings. They are not designed to monitor Class 4 or even Class 3 environments, and their sensor technology can be more prone to fouling than a PID sensor due to their optical sensor technology. This is especially an issue with NDIR systems. Depending on the design, some photo-acoustic sensors (PAS) can be robust against fouling but, this technology is more appropriate for speciating one or a few compounds and not a broad simultaneous detection of the range of compounds found in Class 3 and 4 environments. Star-configuration multipoint sampling systems such as this are generally much lower in cost to implement than a networked air sampling system.

The tubing media such as for tubing 413, 416, 419, and 422 can vary based on application and commercially available systems. With star configured multipoint sampling systems, such as most refrigerant monitoring systems, high density polyethylene tubing (HDPE) is commonly used. For systems which need to also monitor particulate matter in addition to volatile organic compounds and other parameters, an electrically conductive tubing may be utilized. U.S. Pat. No. 7,360,461 B2 describes a structured cable used with a networked air sampling system that incorporates power and communications wiring with an electrically conductive Kynar® tubing that is doped with carbon nanotubes in order to achieve good electrical conductivity and inertness to chemical exposure.

Although many exhaust fan systems such as 300A and 300B are designed to incorporate a bypass air element 301, it is possible to specify these systems to be configured without any bypass air option 301. This can be accomplished if the physical size of the exhaust fan (309, 310, 311, 323, or more generally 203) can be chosen so that there will be adequate fan exit velocity and dilution characteristics when the total system exhaust CFM (221) is at a design minimum value. When this can be accomplished, better energy efficiency will result because excess fan energy will not be expended on bypass air 301. Such an approach can be problematic, however, if at a future date it becomes desirable to reduce lab flows which contribute to exhaust CFM 221, as this can result in insufficient exit velocity of air 312. This has become a serious issue for example with many legacy lab systems that were first commissioned years ago using higher lab air change rates, based on what used to be acceptable practice. If for example, the labs of FIG. 2 were originally commissioned at 12 ACH (what used to be acceptable practice), the potential for saving energy by reducing lab ACH values to 6 ACH would be significant but not possible if the reduction of lab exhaust CFM 221 would result in unsafe fan exit velocities.

Over recent years, there have been tremendous advancements in the capabilities of smart device available for Internet of Things (IoT) applications. These applications focus on providing low cost ways to share data between simple devices (including sensors and electronics) and other Internet connected devices and systems. At the heart of these advancements has been the development of very fast microcontroller products with data processing capabilities that rival that of personal computers, while also being small in size and easy to integrate into an electronic design. The data communications (herein IoT communications) capabilities supported by these smart devices (herein IoT modules) is well known to those familiar with IoT technology.

Note that IoT communications may incorporate methods of connecting data to the Internet or Internet connected servers, using one or more stages of the communications may not incorporate an Internet protocol. As an example, Sigfox is a popular cellular network used to indirectly connect devices to the Internet. As is known to those skilled in the art of IoT, Sigfox employs a proprietary technology using the ISM radio band to provide a low power wide reaching wireless connection. In this example, individual devices are not connected directly to the Internet, but are connected through the Sigfox network to the Internet.

One of the IoT communications known in the art is LoRa® and is described in U.S. Pat. No. 7,791,415 which is incorporated herein. LoRa®, which stands for Long Range, is a low power wireless communication technology that is well suited for transmitting data over great distances within almost any building. Historically, wireless communications within most buildings over more than a few hundred feet distance is problematic for most other wireless communications. LoRa® is suitable for communications between devices located in a building, but it also provides an effective way to connect devices to the Internet.

Other IoT communications include but are not limited to: WiFi/IEEE 802.11, Bluetooth, Bluetooth Low Energy (BLE), Sigfox, 6LowPan, IEEE 802.15.4, Ethernet, LPWAN, MQTT, Thread®, and a number of cellular technologies (LTE CAT M1, 2G, 3G, 4G).

Examples of IoT modules include but are not limited to: various modules by Particle IO (Photon, Electron, Xenon, Boron, Argon), ESP32 by Espressive Systems, Raspberry PI 3 Model B by Raspberry Pi Foundation, IMP005 by Electric Imp, Arduino MKR1000 by Arduino, various modules by Pycom Inc. (Lopy, Fipy, Sipy), and PIC-Web by Olimax Ltd.

Other methods of connecting devices or systems to the Internet have existed for many years. One of the more relevant methods has included a physical Ethernet connection using what's known in the art as a gateway, router, or server (herein server). In building automation applications, the server often consists of an industrial grade computer which may run one of any number of operating systems, including but not limited to any version of Microsoft® Windows, Windows Server, Linux, and other operating systems. The server will often run software that's known in the art as a "service", and said service is responsible for collecting data from the devices at its location and communicating this data to the Internet. Often this Internet communications is accomplished using what's known in the art as TCP/IP Sockets communications. Said sockets communications communicates over the Internet with another service that is also running on a server at another location. For example, information management server 427 is an example of such a server that would operate the described service. An example of a product which operates in this manner is the IMS100, which is manufactured by Aircuity, Inc. Communications from a field device using a server such as this shall also be considered to be IoT communications.

Examples of IoT modules include but are not limited to: various modules by Particle Industries Inc. (Photon, Electron, Xenon, Boron, Argon), ESP32 by Espressive Systems Pte. Limited, Raspberry PI 3 Model B by Raspberry Pi Foundation, IMP005 by Electric Imp® Inc., Arduino MKR1000 by Arduino S. R. L., various modules by Pycom Limited (Lopy, Sipy, Wipy).

SUMMARY

Embodiments of the present invention provide systems and methods which enable the reliable implementation of exhaust demand control for the energy efficient operation of a laboratory exhaust fan system. Aspects of the invention address elements to enable the reliable sensing of lab exhaust contaminants using a multipoint air sampling system. Embodiments of this invention apply to any type of multipoint sampling system, including but not limited to star configuration and networked air sampling systems. While exemplary embodiments are shown in conjunction with a PID sensor, the methods are suitable for any type of sensor that can be used with a multipoint air sampling system.

In one aspect of the invention, one or more measures to ensure sensor accuracy and reliability includes methods of isolating the one or more sensors from contaminants when sensed contaminant levels exceed an action level setting. Another aspect of the invention ensures sensor accuracy and reliability using methods of sample dilution. Still another aspect of the invention ensures sensor accuracy and reliability by applying methods of flushing the air sampling tubing connected from each sensed location and the multipoint air sampling system, said flushing is applied when sensed contaminant levels exceed an action level setting.

In other aspects of the invention, the exhaust demand control logic includes embodiments which ensure the stable operation of the exhaust fan system as it is commanded in and out of a state of setback. This includes embodiments which incorporate a fixed sequence delay, as well as embodiments which incorporate an adaptive variable delay within the control logic.

Embodiments of the invention may also incorporate embodiments which both enhance the fail-safe and overall safety aspects of exhaust demand control, using a number of fan setback override features. An exemplary fan setback override feature is based on system error conditions. As an embodiment, a system error condition which will override fan setback, includes an override which is activated over an IoT connection when it is determined that the calibration of one or more sensors of the multipoint air sampling system has expired. Other embodiments include the use of an occupancy signal to override fan setback. In this embodiment and example application includes certain conditions where high risk lab chemistry may be in use. Still other embodiments include overriding fan setback when certain weather conditions exist in which it may not be beneficial to operate the exhaust fan system at reduced exit velocities.

Aspects of this invention may be suited for use with exhaust fan systems that incorporate a bypass air element. In one embodiment, the bypass air element is modulated so that the total CFM delivered by the exhaust fan system is reduced when commanded into a state of setback. For other cases in which a bypass element does not exist within the exhaust fan system, embodiments of this invention provide an exhaust demand control function which incorporates clean exhaust minimum ACH logic.

BRIEF DESCRIPTION OF THE DRAWINGS

The foregoing features of this invention, as well as the invention itself, may be more fully understood from the following description of the drawings in which:

FIG. 10 is a detailed illustration of the valve logic of a multipoint air sampling system in accordance with embodiments of the invention;

FIG. 11 is an illustration of embodiments involving control logic used to lower exhaust fan flows, as elements of the exhaust demand control logic in accordance with embodiments of the invention; and FIG. 12 is a schematic representation of an exemplary computer that can perform at least a portion of the processing described herein.

DETAILED DESCRIPTION

Figure 1:
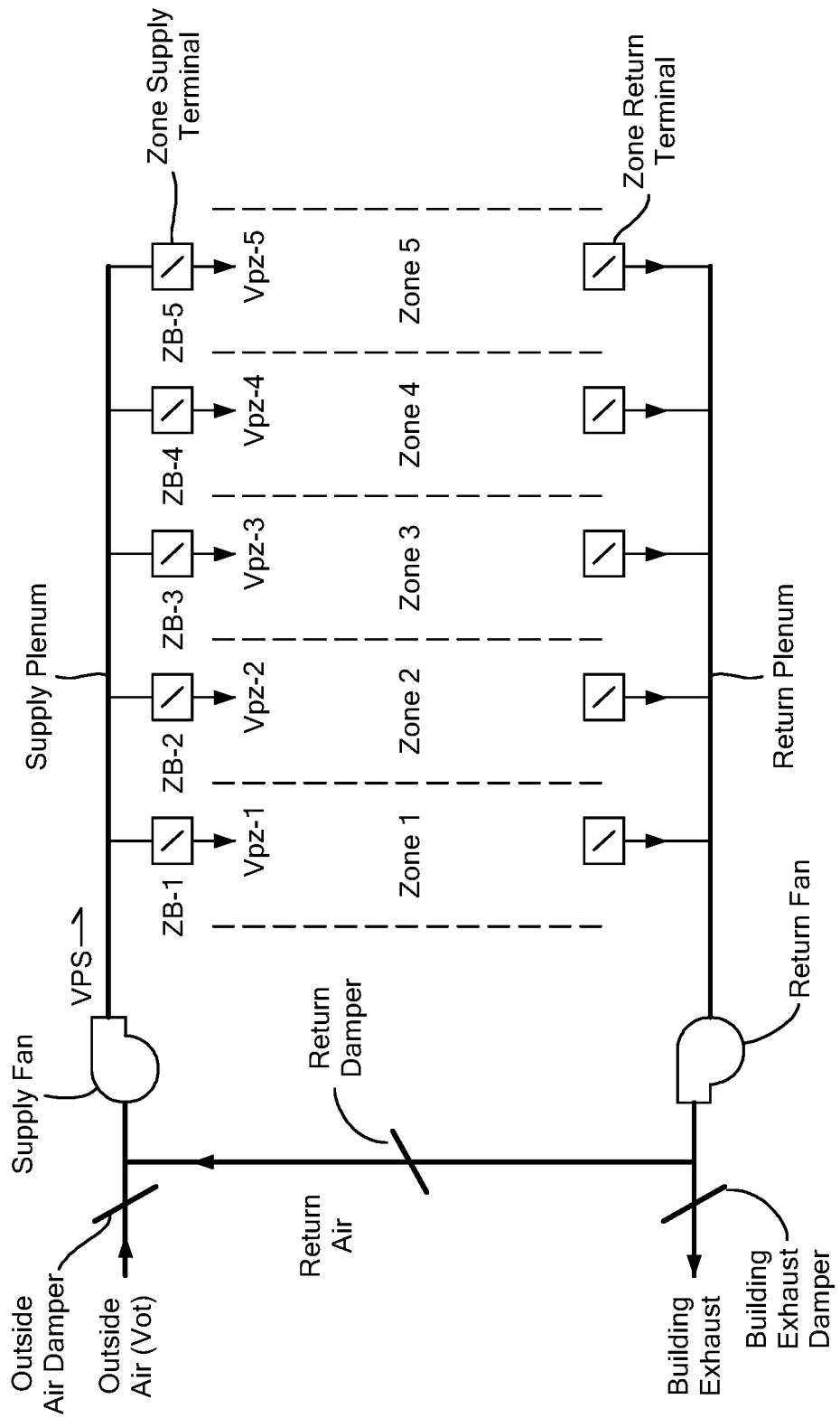
FIG. 1 is a simplified schematic illustration of a prior art recirculating air distribution system.
Figure 2:
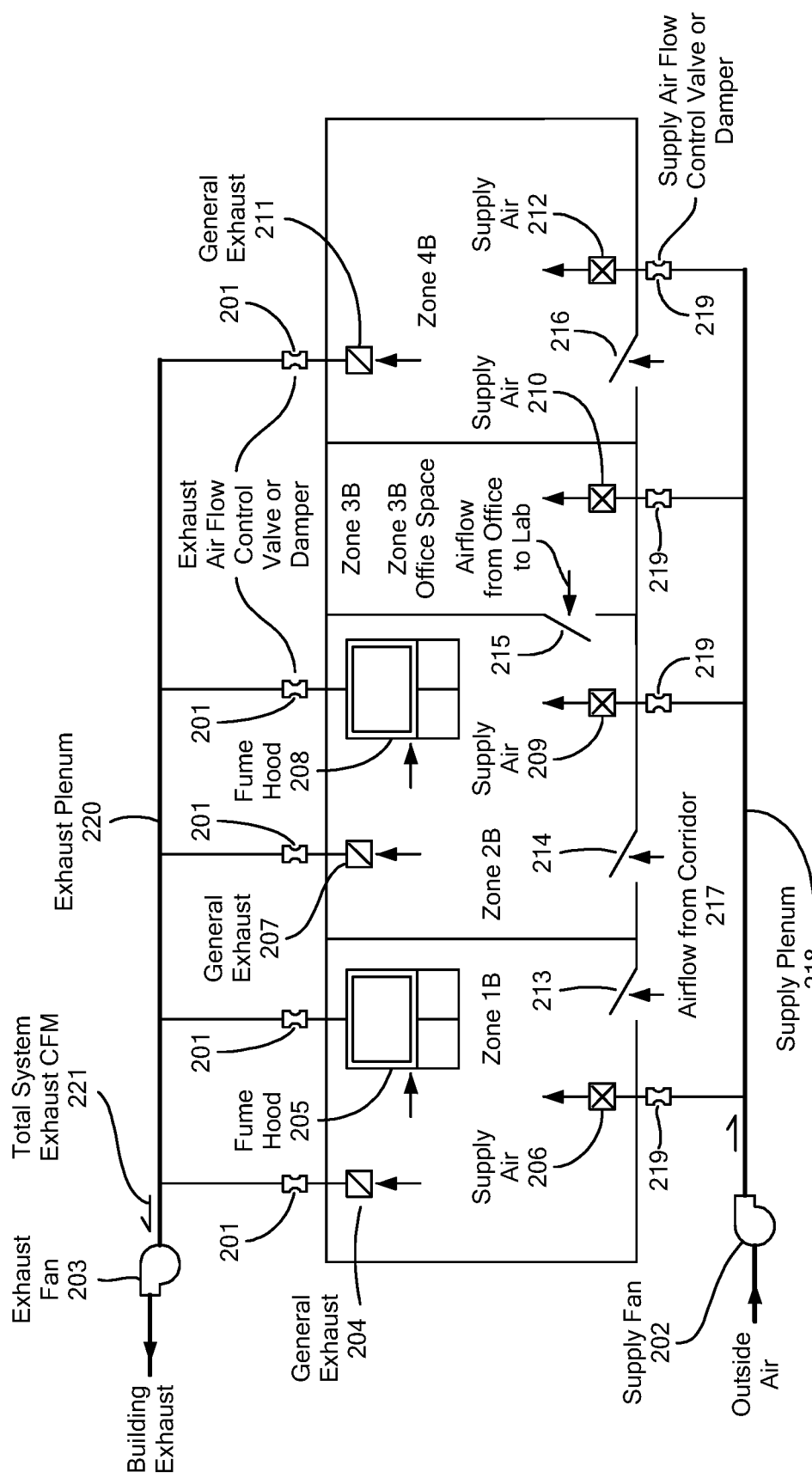
FIG. 2 is a simplified schematic illustration of a prior art multiple zone lab ventilation system.
Figure 3A:
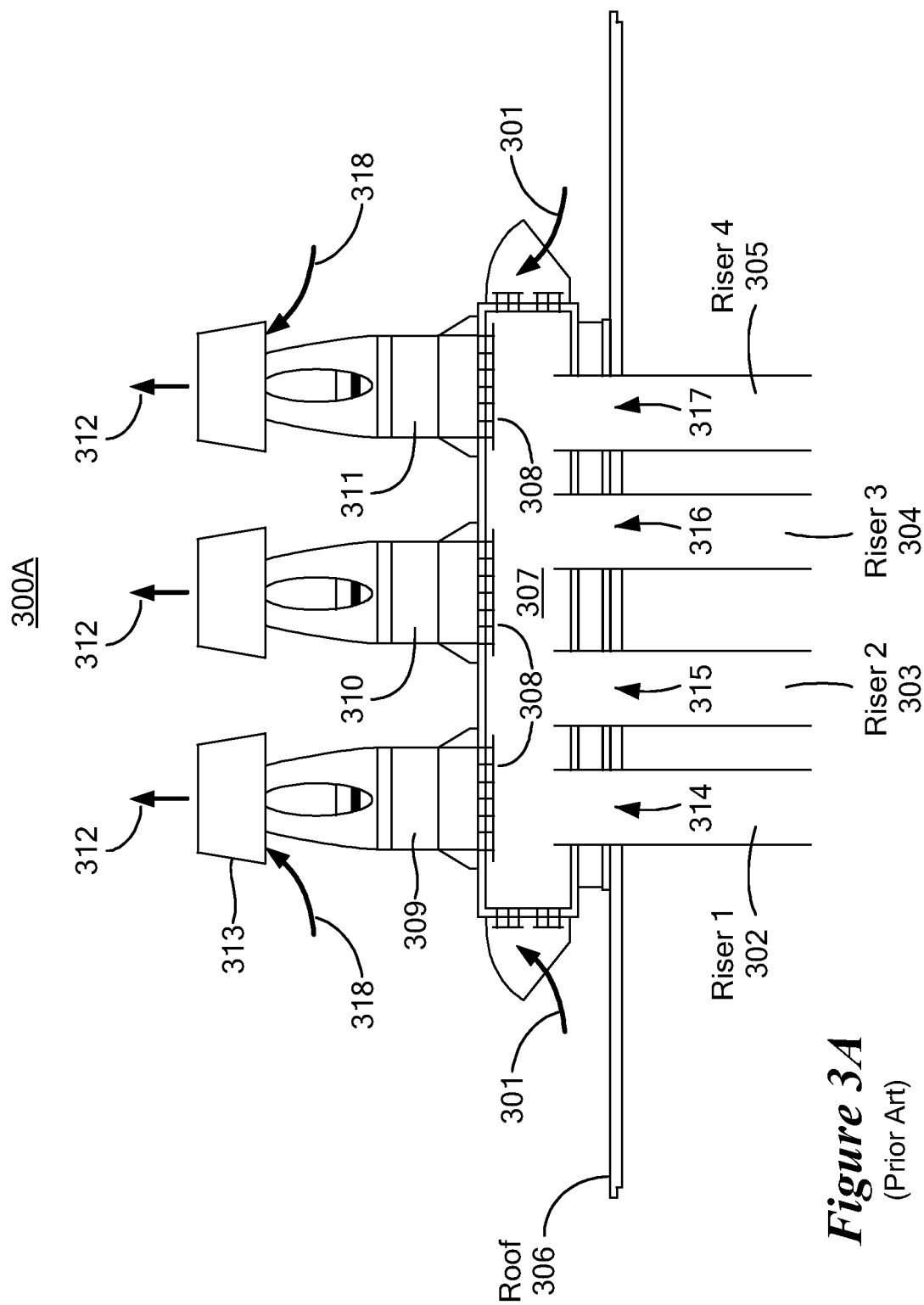
FIG. 3A illustrates a conventional prior art high plume fan system.
Figure 3B:
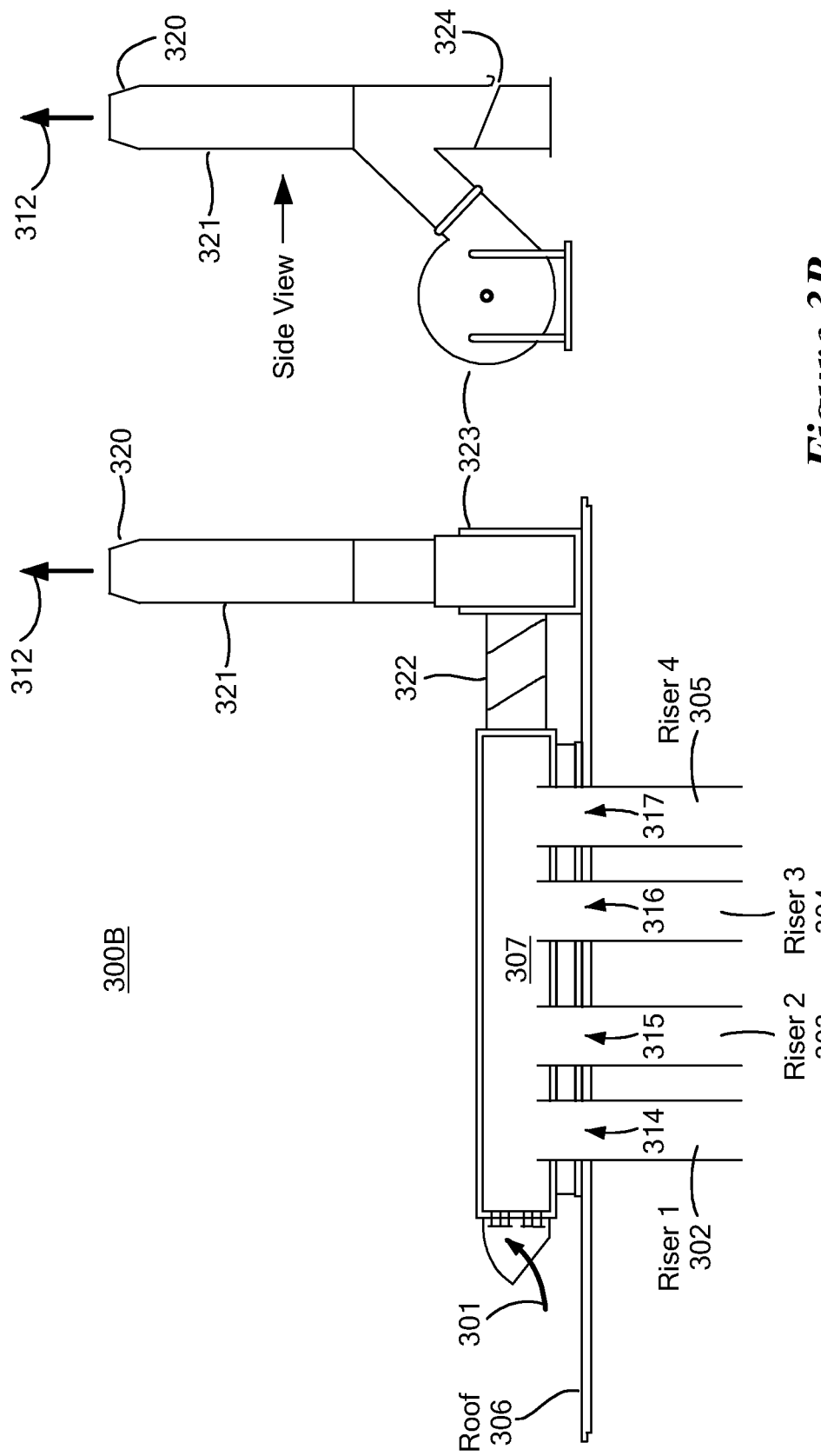
FIG. 3B illustrates a conventional prior art exhaust fan system using a fan system other than a high plume fan system.
Figure 4:
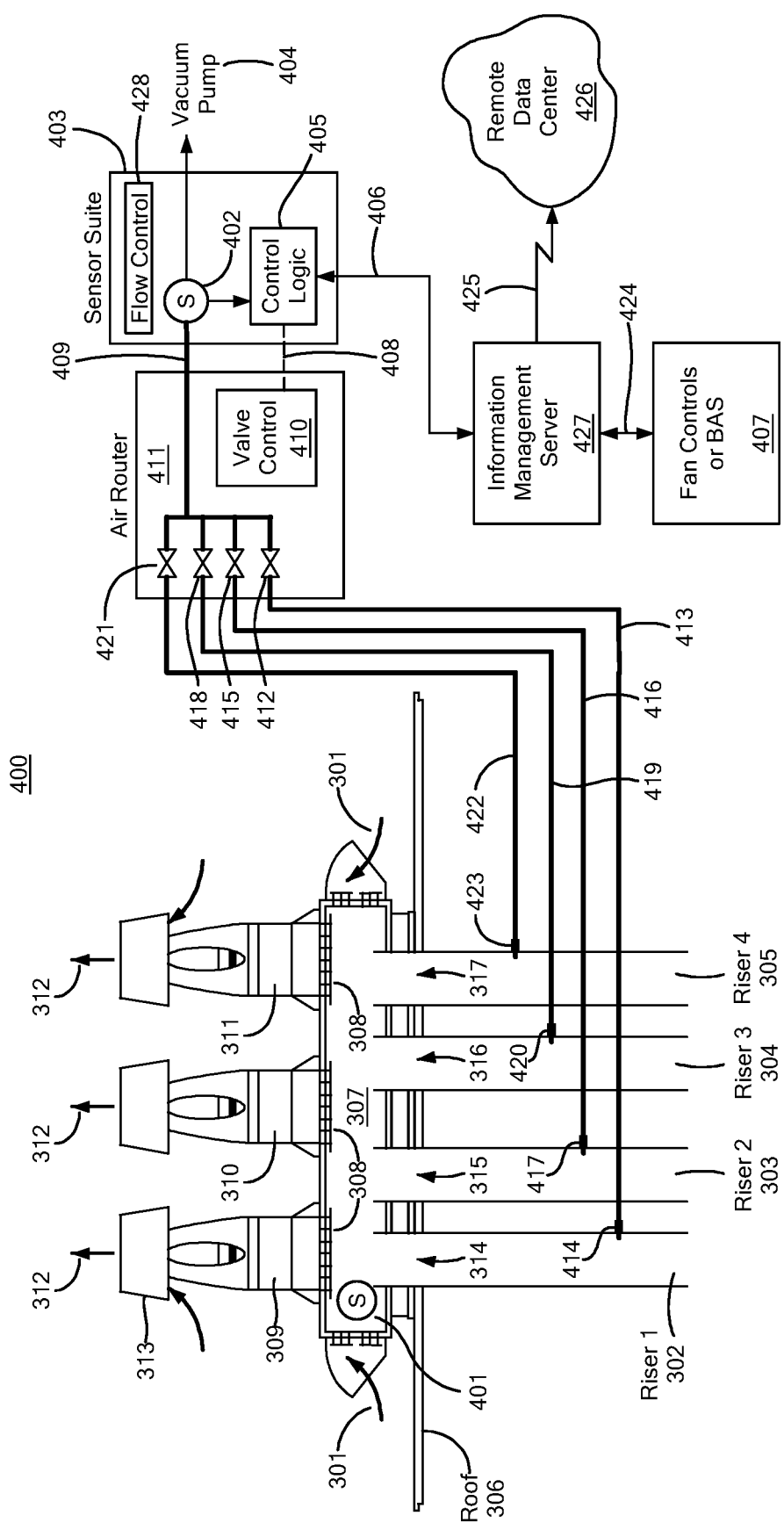
FIG. 4 illustrates two prior art approaches used to detect contaminant levels in a lab exhaust stream.

Embodiments of the invention provide apparatuses and methods for exhaust demand control. Embodiments of the invention are useful for monitoring contaminants within at least a portion of the exhaust air conveyed by an exhaust fan system in order to control one or more aspects of the exhaust fan's energy use. Reliability and ease of implementation of contaminant sensing are addressed in illustrative embodiments of the invention. In some embodiments, a system can factor in variable outdoor environmental conditions in order to influence the reliability of the exhaust demand control. A yet further aspect factors variable indoor conditions to minimize risks associated with the performance of the exhaust demand control. Example embodiments are applicable to high plume fans or other lab exhaust fan systems which may incorporate a bypass at one or more locations within the exhaust ductwork or plenum in order to influence the fan's dilution or exit velocity characteristics. In addition, some exhaust fans do not incorporate a bypass but can vary the amount of dilution they provide along with dispersive characteristics by varying fan speed. For example, entrained air can be increased at the fan's nozzle in order to provide added dilution to the total system exhaust.

Sensors used to detect indoor air contaminants may be exposed on a continuous basis to the environment or environments being sensed by the device. Data from these sensors may be recorded on a fixed time interval using well established sampling techniques or the data may be generated on an irregular basis, using a change of value (COV) technique. COV based monitoring records or communicates data when the measured property has changed by some predetermined amount from its last recorded value. In the case of a discrete sensor such as 401, it is continuously exposed to the air within plenum 307, regardless of the intensity of contaminants there within. By comparison, sensor 402's exposure to exhaust contaminants may on average be similar to that seen by sensor 401 however, it will tend to see higher peak contaminant concentrations than 401 because individual air samples from risers 302, 303, 304, and 305 are conveyed to sensor 402 in a sequential manner. These peak contaminant levels may foul sensor 402 more readily than the rate at which sensor 401 is fouled.

With the exhaust demand control application, the exhaust air should be examined for contaminants with some minimum frequency. For example, when there is a chemical spill within a fume hood that is served by an exhaust fan system the exhaust demand control strategy should be able to detect the presence of contaminants at concentrations which exceed a pre-determined threshold (herein the action threshold) in order to command the exhaust fan to deliver a maximum exit velocity within a few minutes (e.g. 2-3 minutes) of the spill. This means that, for those times where exhaust contaminants are less than the target threshold, samples from sensor 401 need to be taken every few minutes. For sensor 402, location 302, 303, 304, and 305 should be sampled within the same few minute period. When exhaust contaminants exceed the action threshold value however it is not necessary to continue to sample data from sensors 401 or 402 at the same rate, and a much slower sampling rate is possible while ensuring safe operation of the fan.

As a measure to ensure sensor accuracy and reliability, an embodiment of this invention takes advantage of the fact that when exhaust contaminant levels exceed the action threshold, as long as the exhaust fan has been enabled to operate at a higher exit velocity, data from the sensor used for exhaust demand control can be acquired at a reduced rate and therefore, the average exposure duration of the sensor may be reduced in order to protect the sensor from fouling.

Example embodiments incorporate a multipoint air sampling system designed to monitor exhaust air which may include one to any number of sampled locations; herein referred to as monitoring points. In a typical application 1 to 6 monitoring points may be sufficient, however, embodiments of the invention may support any number of monitoring points. Generally, a monitoring point is required per exhaust duct riser that connects to the plenum 307 of the exhaust fan system 203 to which exhaust demand control is being applied. However, embodiments are not limited to monitoring only a single location per riser. In some cases, it will be beneficial to monitor multiple locations along the length of a riser, or even multiple locations that run horizontally on a given floor in the building. In some applications, such as when there are only limited number of fume hoods in a building, it may be advantageous to monitor locations in the exhaust duct where effluent from clusters of fume hoods is concentrated, rather than assigning monitoring points to known clean exhaust sources. Although the figures included in this disclosure illustrate scenarios where a single monitoring point is applied per riser, example embodiments are not limited to a single monitoring point per riser, as it applies to the implementation of any number of monitoring points per riser and further does not require that all risers be monitored. In some embodiments, no monitoring points will be assigned to a riser but instead may be assigned to various horizontally connecting duct locations in the building. More generally, embodiments of the invention may apply to monitoring any exhaust duct location that may include riser locations, one or more locations within the plenum such as 307, horizontal ductwork locations per floor, individual exhaust locations at a fume hood, as well as individual duct locations specific to canopy hoods, snorkel exhausts and general exhausts.

Figure 5:
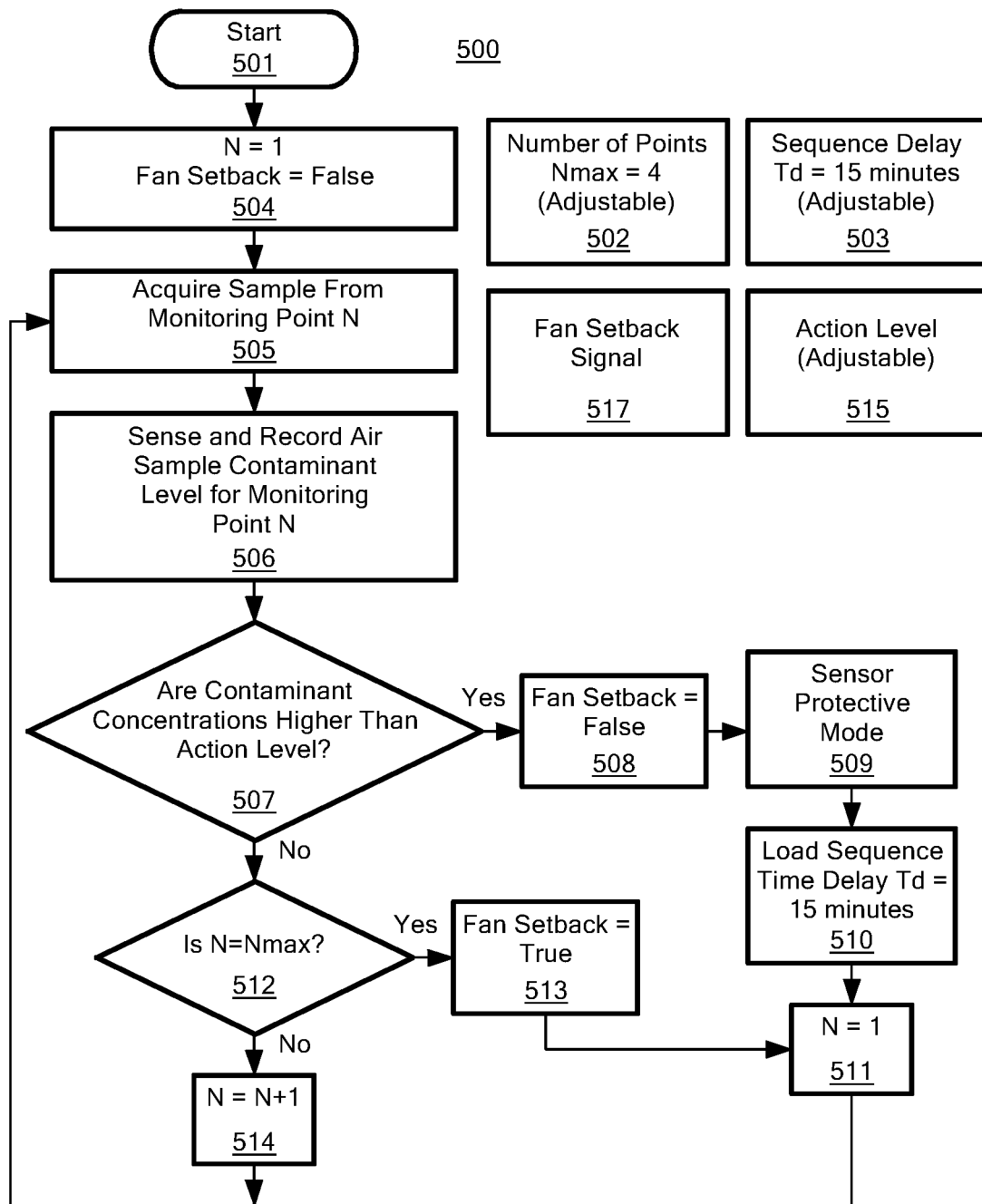
FIG. 5 is a flow diagram which illustrates elements of the exhaust demand control logic and other functions in accordance with embodiments of the invention.
Figure 6:
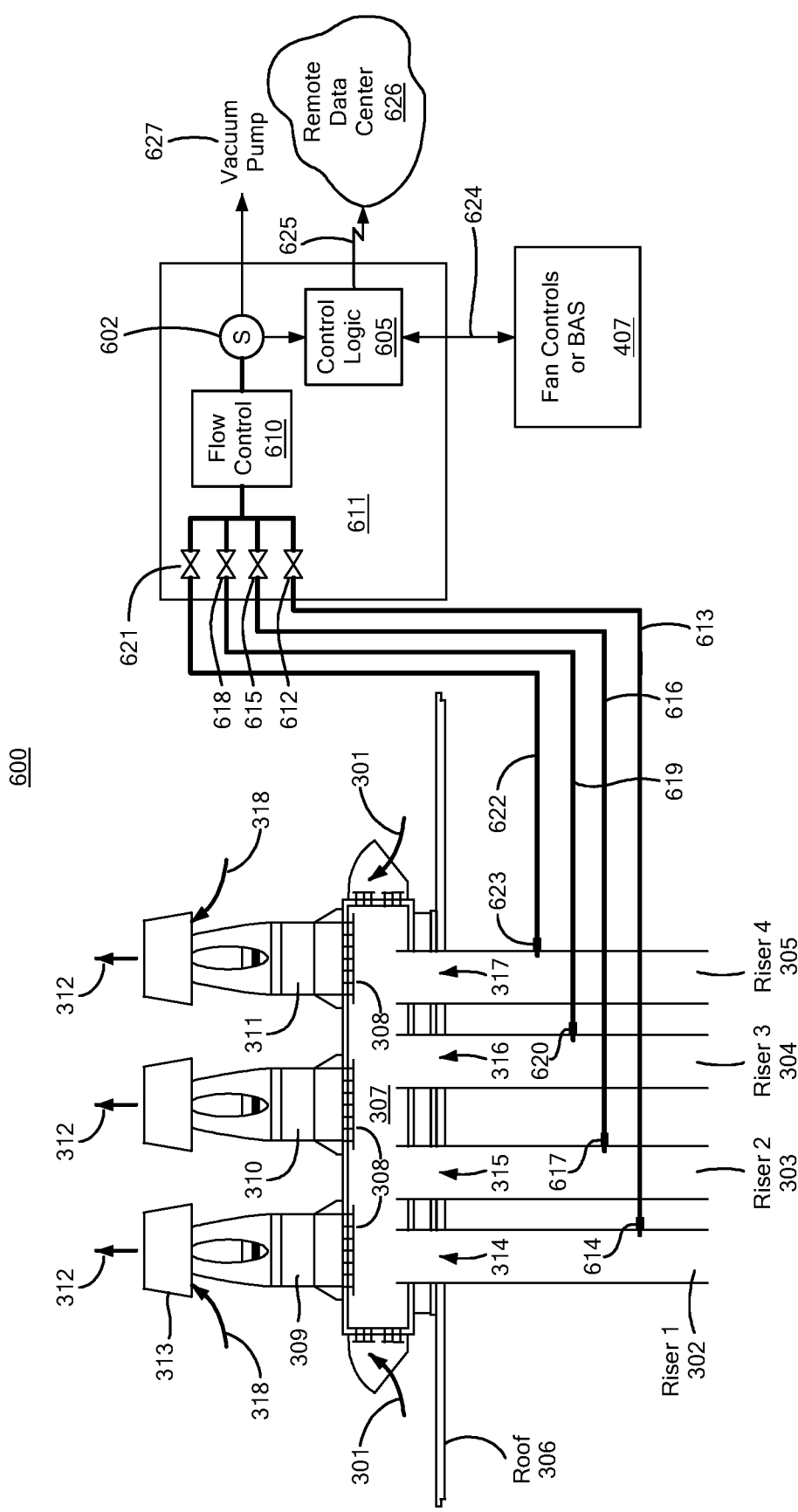
FIG. 6 is an illustration of aspects of an exhaust demand control system in accordance with embodiments of the invention.

FIG. 5 is a flow diagram which provides illustrative embodiments of the exhaust demand control logic which includes air sampling logic and other logic. FIG. 6 is an illustration of further details of an exhaust demand control system that includes a multiplexed air sampling system 611 to which 500 is applied. Logic 500 is executed using one or more CPU's that perform control logic 605. Logic 500 is therefore a subset of the overall logic 605 needed to operate the system 611. In one embodiment, the one or more CPU's which perform logic 500 are contained within the panel or enclosure that houses the air sampling system 611. In another embodiment, any portion of the logic 500 is executed by a CPU that is physically separated from air sampling system 611. As an embodiment, logic 500 is performed by a CPU that communicates to 611 through a data communications network which sends commands to 611 as it executes logic 500. In one embodiment, the said data communications network is an internet connection to a cloud-based CPU, such as that contained within a server device. In another embodiment, the said data communications network is a local area network or LAN, said LAN includes any number of physical networks used to network devices in a building. In another embodiment, the said data communications is a point to point wireless connection between system 611 and the device with a CPU that is physically separated from the system 611. In one embodiment, at least a portion of logic 500 is executed using a CPU that is part of the Building Automation System. In another embodiment, at least a portion of logic 500 is executed by an Internet connected CPU.

Control logic 605 controls the flow control components within 610, as described further below. Control logic 605 also acquires readings from sensor 602 and is responsible for any external communications such as 624 (to the fan controls or BAS) and IoT Communications 625 to a remote data center. In one embodiment, air sampling system 611 is contained within one panel or enclosure and the one or more CPU's which perform control logic 500 and 605 is executed using a microcontroller. Other embodiments can also include distributed applications of 611, such as with a networked air sampling system topology where elements of 611, such as valves 621, 618, 615 and 612 along with valve control 410 may be located remotely from control logic 605. In one embodiment, control logic 605 may in whole or in part be contained remotely from valves (621, 618, 615, 612), flow control 610, and sensor 602.

As an exemplary embodiment, the CPU incorporated within 605 is an ARM Cortex M3 micro-controller which incorporates a Broadcom Wi-Fi chip. Examples of this include the Particle Photon, by Particle Industries Incorporated, which is an Internet of Things (IoT) module. In this embodiment, control logic 605 uses a Wi-Fi connection as IoT communications 625 in order to access remote data center 626.

As an embodiment, the provision of IoT communications 625 which connects control logic 605 and remote data center 626, enables system 600 to be remotely and proactively monitored by a support team or remote monitoring software that is part of remote data center 626, or both a support team and remote monitoring software. This enables issues with system 600 to be identified and communicated to field personal who can address problems with 600 as they occur. For example, said proactive monitoring can be valuable for identifying conditions that would result in error condition 705, such as but not limited to a failed vacuum pump 627, which would cause setback signal 517 to be set to False, thus causing fans 309, 310, 311 to not be setback which results in higher energy consumption.

One aspect of logic 500 is the ability for error condition 705 to provide enough functionality to ensure that the likely sources of electronics, power, or other failures in system 611 will not create a safety issue with the exhaust fan 203. For example, a malfunction with sensor 602 could result in an erroneous and potentially dangerous condition where fan setback signal is set to True, resulting in low fan 203 exit velocities, even when the exhaust 221 contains high contaminant levels. Such a condition can result in environmental health issues for the building occupants. If for example sensor 602 is a PID sensor, it requires periodic maintenance and calibration (the calibration period), usually every 6 months for example. When the sensor 602 in this example has operated for more than 6 months, it may be said that the calibration has expired. Such maintenance requires that a trained technician visit the facility in which system 611 is installed. If, however, that maintenance is not performed at the right interval sensor 602 may not perform correctly, leading to an erroneous fan 203 setback condition. In one embodiment, a sensor maintenance override may be activated through remote data center 626. In this embodiment, remote data center 626 enables an error condition 705 to be set remotely so that fan setback override 701 is set to True and the fan setback signal 517 is set to False, when the sensor calibration of 602 has expired. This would be accomplished via IoT communications 35, either using logic that is manually set within remote data center 626, or by using a programmed schedule within 626. Using this approach of managing a sensor maintenance override using a remote data center 626, as one embodiment, also enables an organized communication of this event to facility personnel and other individuals responsible for the exhaust fan system 600, using email, texting, or social media such as but not limited to Facebook and Twitter.

In embodiments, sensor 602 can include one or more contaminant sensors including but not limited to: a photoionization detector, a sensing instrument based on photoacoustic infrared spectroscopy, a TOC sensor, an acid gas sensor to detect any of various acids, an airborne particle counter, an ammonia sensor, an arsine sensor, a chlorine sensor, a chlorine dioxide sensor, a combustible gas sensor, a diborane sensor, an ethylene oxide sensor, a fluorine sensor, a metal oxide semiconductor (MOS) sensor, a hydrazine sensor, a hydrogen chloride sensor, a nitric acid sensor, a hydrogen cyanide sensor, a hydrogen selenide sensor, a hydrogen sulfide sensor, a mercaptan sensor, a nitric oxide sensor, a nitrogen dioxide sensor, a phosgene sensor, a phosphene sensor, a silane sensor, a sulfur dioxide sensor, and a tetrahydrothiophene sensor. In one embodiment, sensor 602 comprises a flame ionization detector (FID). FIDs operate on a similar principle as PIDs except, instead of utilizing a UV lamp to ionize compounds, an FID utilizes a flame to provide ionization via combustion. FID typically use hydrogen as the fuel source for the flame. An FID has the advantage of being able to ionize and therefore detect more compounds that are generally detectable by a PID. As one embodiment, sensor 602 is a PID sensor. As an exemplary embodiment, sensor 602 is a PID with a 10.6 eV lamp. Based upon the aforementioned sensor types which may be used for sensor 602, it should be clear that embodiments can apply to either monitoring a specific compound or, a specific species, as well as to the application of broad sensor technology (such as a PID for example) which is not specific and does not speciate.

The logic 500 may apply to any suitable multipoint system topologies including but not limited to star configurations and networked air sampling systems. In one embodiment, the sequence is representative of the hardware and software which form the workings of an example multipoint sampling system which supports the exhaust demand control application when operating in conjunction with a high-plume exhaust fan.

At the start of the sequence 501, the system 500 undergoes initialization where settings such as the number of monitoring points 502 are loaded into the memory associated within a CPU contained within 500, such as within control logic 605. As an embodiment, each time the system 500 is reset, the fan (such as fans 309, 310, and 311) will be commanded by 500 to its maximum exit velocity via logic 504 for safety purposes, until 500 establishes that the contaminant levels for monitoring points below the action level 515. The signal used to command said exit velocity state shall herein be referred to as a "fan setback signal". As one embodiment, when the fan setback signal 517 is "True" it conveys to the fan controls that the fan system should setback to a predetermined exit velocity. In this embodiment, when the fan setback signal 517 is "False" it conveys to the fan controls that the fan system should operate at its higher exit velocity.

As one embodiment, the action level may be a setting that resides within the field installed system, such as a value programmed into 611 or as an alternate embodiment, it may be an electronic setting, such as a potentiometer or some other hardware setting within 611. As yet another embodiment, action level 515 is a value communicated to 611 by an external device via interface 624 that includes but is not limited to: a building automation system (BAS), a networked air sampling system, a wireless or wired connection from a handheld device such as a mobile device. As another embodiment, the action level may be commanded or altered via the data center 626, or by way of what's known in the art as a RESTful interface or API. Interface 624 includes but is not limited to a BACnet network connection, an 802.11 or Wi-Fi interface, a Bluetooth® or 802.15.1 connection, a Modbus network connection an RS485 communication network, a ZigBee wireless network, analog signals including but not limited to 0-10 VDC or 4-20 ma current loop. Note that the action level 515 will vary based on the application and the type of sensor used in 602. If for example 602 is a PID with a 10.6 eV lamp, then the action level may be set but is not limited to a setting between 0.4 and 1 ppm as isobutylene.

It should be apparent to those skilled in the art of integrating HVAC controls equipment that any form of wireless or wired analog or digital communications can be used to support interface 624. As one embodiment, interface 624 also may support one or more relay contacts used to command the controls to the exhaust fans 309, 310, and 311 to a higher lower exit velocity state based on the state of setback signal 517. This embodiment has the advantages of providing electrical isolation between system 611 and the fan controls or BAS 407, while also providing a signal that can be configured to be failsafe to a power outage at 611. This is accomplished by configuring the relay of this embodiment so that a fan setback command from logic 605 to controls 407 is provided when the relay is in its energized state. For example, if a relay contact closure signifies a fan setback command the relay would be configured so that it needs to be energized for it to be in this state. Therefore, if power is lost, the relay will automatically be deenergized which will cause the contacts to open, thus signifying to controls 407 that the fan 203 should not be setback.

Logic element 504 also sets a counter variable "N" so that the air sampling sequence will start at the first monitoring point. Which monitoring point (614, 617, 620, 623) system 500 draws an air sample from first, is arbitrary and it should be clear that any order with which the sampling process acquires air samples from monitoring points is considered to be within the scope of this invention. Counter variable N within logic element 504 is used to keep track of how many of the monitoring points (614, 617, 620, 623) have been sampled during each cycle of the sampling sequence. One complete cycle occurs when all of the monitoring points (614, 617, 620, 623) have been sampled. It should be clear that the number of monitoring points is not limited to 4, such as in this example, but that it can include one to any number of monitoring points.

In logic element 505, a sample is acquired from the monitoring point designated by counter variable N. For example, if N=1 then an air sample from the first monitoring point in the sequence will be conveyed to sensor 602, as described by logic element 506, using flow control 610. Flow control 610 may incorporate valve control 410 and flow control 428 and may incorporate capabilities to support sensor protective mode 509 which is discussed further below. As each sample is sensed by sensor 602, as described by logic element 506, the measured contaminant value is stored in memory within control logic 605. The contaminant level measured in logic element 506 is then compared against the action level in logic element 507. If the contaminant level measured from the monitoring point in 506 is greater than the action level 515, then the exhaust fan must be set to its higher exit velocity. This is accomplished in logic element 508 by setting the fan setback signal 517 to "False". This information is communicated via 624 to the fan controls or the BAS which may be controlling the fan.

Once a condition has been detected where contaminant concentrations exceed the action level causing 508 to set fan setback signal 517 to False, as an embodiment, multiplexed air sampling system 611 will be placed into sensor protective mode 509. Sensor protective mode, a measure to ensure sensor accuracy and reliability, includes a number of embodiments which are intended to protect the one or more sensors 602 from fouling, drifting in calibration, or other forms of sensor malfunctions, and other influences which can cause the sensor 602 to not read correctly as a result of exposure to high concentrations of contaminants in the exhaust streams 314, 315, 316, and 317 for extended periods of time. Embodiments are not limited to the number of monitoring points it can connect to and therefore, are not limited to monitoring just four exhaust streams such as 314, 315, 316, and 317. More generally, embodiments are applicable for monitoring from one to any number of exhaust streams. While system 611 is in sensor protective mode 509, the fan setback signal 517 will be set to False, resulting in the fan operating at its higher exit velocity setting for safety.

As one embodiment of sensor protective mode, when this mode is enabled, multipoint air sampling system 611 will discontinue its air sampling sequence for a period of time designated by sequence delay 503. By discontinuing the sampling process in 611, sensor 602 is isolated from the contaminants in the exhaust streams being monitored, which prevents the sensor from being overexposed on a continuous basis and thus ensures sensor accuracy and reliability will be maintained. As one embodiment, sequence delay 503 is a fixed value. Typical fixed values of sequence delay 503 include but are not limited to values that range from 10 minutes to 20 minutes. In an embodiment, sequence delay 503 may be a configuration parameter of multipoint sampling system 611 that is set within the control logic 605 memory or that is based upon a hardware setting in 611 that includes but is not limited to a potentiometer, jumper, or dip switch setting. As an alternate embodiment, sequence delay 503 is a value that is communicated to 611 via communication 624 from the fan control system or BAS 407.

As an alternate embodiment, sequence delay 503 is variable or adaptive depending on the frequency with which the sensor protective mode 509 is enabled. In this embodiment added protection can be provided to sensor 602 by further reducing the frequency with which it is exposed to exhaust contaminants if it is found that the contaminant levels are above the action level 515 for an extended period of time. For example, when the system 611 first goes into sensor protective mode 509, the sequence delay may initially be 10 minutes in duration. If after 10 minutes system 611 still measures contaminant levels above the action level the sequence delay may be increased further to 15 minutes for example. If after this 15-minute period system 611 still measures contaminant levels above the action level the sequence delay could be increased further to 20 minutes, and so on. In this embodiment of an adaptive sequence delay an upper limit to the adaptive sequence delay may be defined in order to limit unnecessary exhaust fan energy use that could result for example at the end of a day where there was a lot of lab activity for an extended period of the day. For example, fume hood use in some facilities may be continuous for 4 to 6 hours of a working day, thereby potentially making the exhaust stream (314, 315, 316, 317) contaminated above the action level for that period. In that case, an adaptive sequence delay 503 that is not properly limited may result in a delay that is several hours long that would cause the exhaust fan to continue to operate at a high exit velocity, wasting energy, for several hours at the end of the 4 to 6 hour working period where the fume hoods are active. It may therefore be advantageous to limit the sequence delay to, for example, less than one hour.

One advantage relates to sensor protective mode and to the stability of the control of the exhaust fan system when changing the exit velocity. As has been described, the exit velocity of exhaust fan systems (which includes high plume fan systems) is controlled using adjustments to the bypass air 301 which may be accomplished using a static pressure control loop that involves controlling the bypass air 301 in order to maintain a predetermined static pressure setpoint within plenum 307. This control may include proportional-integral-derivative control which results in a control loop that is robust for steady state operation but that has what's known in the art of control systems as a "natural response" where the fan speed may temporarily oscillate in a dampened sinusoidal manner when sudden changes to fan speed are created. These oscillations may last for several minutes. In many exhaust fan configurations, the way in which an increase or decrease in exhaust fan exit velocity is achieved is by way of a change in fan speed, from which some level of fan system oscillation may be expected. For example, a reduction in exit velocity would start with a reduction in exhaust fan speed setpoint to each fan's (309, 310, 311) variable speed drive (VFD). Typically, motor/fan speed is measured in Hertz (Hz), where zero Hz would infer that the fan is shut off and 60 Hz would be maximum speed. At maximum speed, the exit velocity and airflow delivered by each fan will be determined by the physical dimensions of the fan and the static pressure setpoint within plenum 307. A typical static pressure setpoint may be −4 inches H2O but that setting could vary considerably depending on the application. As the speed command to each VFD controlling the fans (309, 310, 311) is reduced in order to decrease exit velocities some amount of fan speed oscillation will result due to the natural response of the system. The same will occur each time each fan speed is increased. When exhaust demand control has been implemented, a common problem that is encountered is that speed control of the exhaust fan system can become unstable. This is what's known in the art as "hunting" or "fan hunting", which signifies that the fan system's speed control does not reach a fixed steady state speed. Fan hunting can become a serious problem in that it can result in the premature failure of some fan components, such as the bearings in the fan assembly. The reason why fan hunting may take place with prior art exhaust demand control strategies is that it is often the case that contaminant levels in exhaust flow streams (314, 315, 316, 317) fluctuate considerably above and below the action level over short periods of time (often 1 to 2-minute intervals). As a result, prior art exhaust demand control strategies can result in frequent changes to fan speed setpoint, thus resulting in system instability or hunting.

In embodiments of the invention, logic 500 can provide sequence delay 503, which not only protects sensor 602 via sensor protective mode 509, but it also protects the fans (309, 310, 311) from excess wear and tear that would result from hunting. Such hunting is avoided because the sequence delay 503 will often be set to 10 minutes or more, which is usually more than enough time for most fan speed changes to reach a fixed steady-state value and therefore the exhaust fan system will not hunt because the fan setback signal 517 will not change as rapid changes to contaminant levels in exhaust streams 314, 315, 316, 317 occur.

In an embodiment of this invention, settings within logic 500 which include but are not limited to sequence delay 503 and action level 515 are established using potentiometers within the electronics which operate at least a portion of logic 500. In another embodiment, settings within logic 500 which include but are not limited to sequence delay 503 and action level 515, are established as values in the memory associated with a CPU that performs at least a part of logic 500. In a preferred embodiment, the settings which may include delay 503 and action level 515 as well as other settings associated with logic 500 are configured using a local web page that is served by either a first CPU that at least performs a part of logic 500 or by a second CPU that is physically located within the same enclosure as said first CPU and that is in communication with said first CPU. As has been described, there are a wide variety of IoT modules available on the market and many of these modules have processing capabilities that is suitable for rendering a web page and most support some form of local communications, including but not limited to Blue Tooth and WiFi communications. In an exemplary embodiment, the settings which may include delay 503 and action level 515 as well as other settings associated with logic 500 are configured via a local web page that is served by an IoT module that is housed within the same enclosure as the system 611.

In embodiments, each time logic 500 activates sensor protective mode 509 it resets the monitoring point counter "N" to 1 via logic element 511. Once the system 611 has been in the sensor protective mode state 509 for the duration of sequence delay 503, logic element 511 causes system 611 to reset so that the next monitoring point that it acquires a sample from via logic 505 is monitoring point 1 at the beginning of the sequence. Notice that as the sequence delay 503 expires the fan setback signal 517 will still be in the False state (as per logic 508). This will be the case until logic 500 can successfully sequence through each monitoring point and confirm that the contaminant levels in each are below the action level. Following sensor protective mode 509, logic 500 will loop 516 and logic element 505 will acquire monitoring point 1 and then that sample will be sensed and recorded via logic element 506. If the contaminant concentration in that first monitoring point is verified to be below the action level 515 (via logic element 507), logic element 512 then verifies if the current monitoring point is then last monitoring point in the system. Given that in this example there are four monitoring points (via setting 502) and that the current monitoring point is 1, the logic 500 will then proceed to logic element 514 which then increments counter N by one, following which logic 500 again loops via 516 and the process continues. If contaminant levels in each of the four air streams (314, 315, 316, 317) are found to be below the action level 515 via logic element 507, the logic will loop 516 back through path 505, 506, 507, and then logic element 512 where, on the 4$^{th}$ or final monitoring point, as verified by logic element 512, the logic path will be directed to logic element 513 which then sets fan setback signal 517 to True. With fan setback signal 517 set to True, exit velocities of fans 309, 310, 311 will then be setback via communication 624 to the fan controls or BAS 407. Following logic element 513, the counter N is reset to 1 via logic element 511, and the sequence starts anew as it then loops again through 516 and acquires a sample from the first monitoring point via 505.

Note that the target exit velocity at which the one or more exhaust fans (309, 310, 311) operate at when the fan setback signal 517 is True or False may vary considerably from one application to the next. However, typical design exit velocities are 3000 feet per minute when the fan setback signal is set to True.

Figure 7:
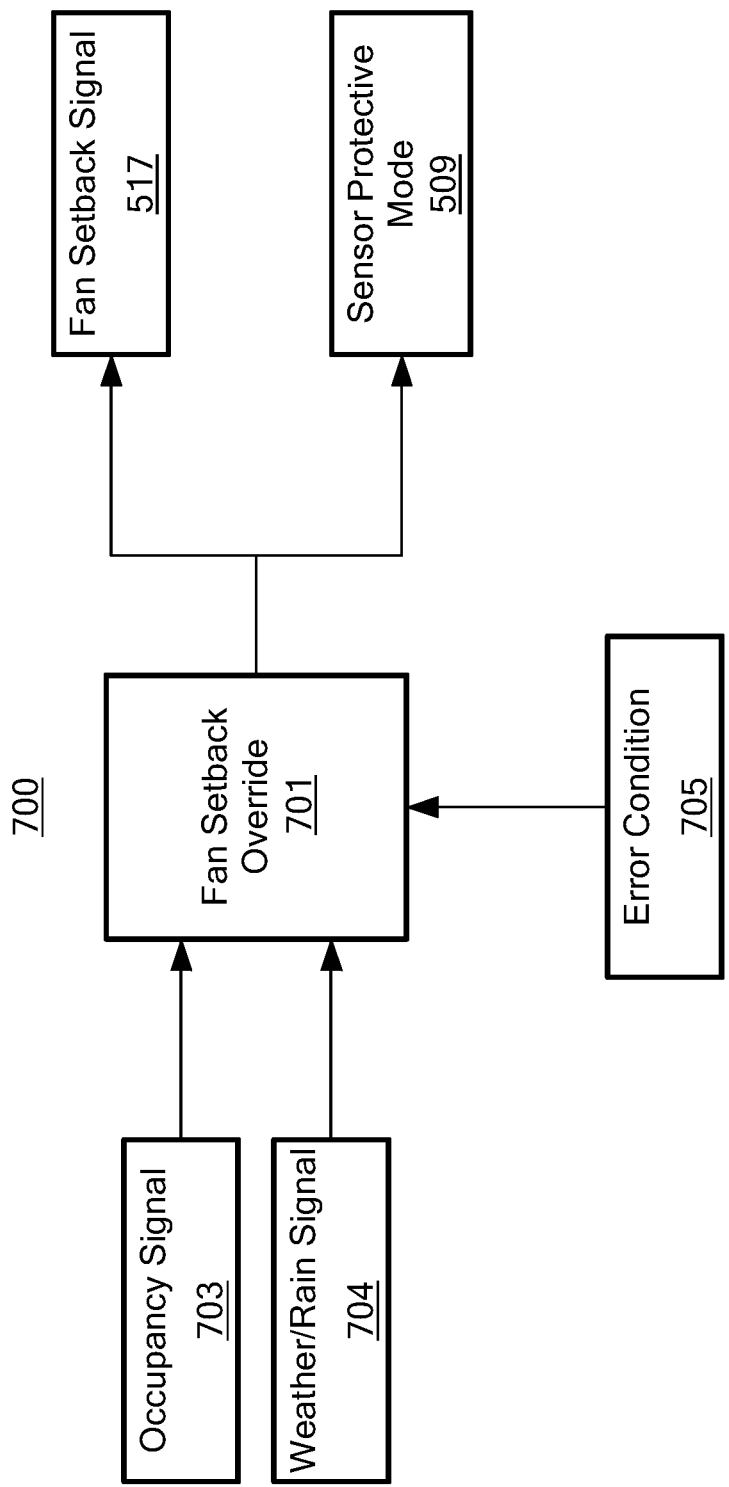
FIG. 7 illustrates embodiments of the exhaust fan setback override in accordance with embodiments of the invention.

FIG. 7 depicts embodiments of this invention where a fan setback override function 701 is implemented in order to further restrict the times where the exhaust fans (309, 310, 311) may be commanded to a reduced exit velocity. As shown in FIG. 7, the setback override function provides an override input to fan setback signal 517 and sensor protective mode 509, based upon a number of possible input conditions that may be monitored (703, 704, 705).

When the setback override function 701 is set to "True" (the override condition) then fan setback signal 517 is set to False, preventing the exhaust fan from being setback. Simultaneously, sensor protective mode 509 will be enabled which will interrupt the air sampling sequence of 611 and isolate and thus protect sensor 602. In application, there are a number of conditions where it's desirable to run the exhaust fan at a higher target exit velocity (such as 3000 feet per minute for example) even if the contaminant levels detected by 602 in exhaust streams 314, 315, 316, 317 are relatively low and well below action level 515. These conditions include but are not limited to certain occupancy conditions, certain weather conditions such as rain, and error conditions within 611.

As an embodiment, the fan setback override function 701 may be a logic element within 611 or it may be a logic element that is external to 611. For example, function 701 may exist within the BAS 407 or some other external controller which communicates through 424.

As an embodiment, occupancy signal 703 is a parameter that can be used for the determination of the fan exit velocity setting. This setting can be useful when it is desired for example to add an extra level of safety to the exhaust demand control application by not allowing the exhaust fan system to setback when certain portions of the building where 611 is applied become occupied. For example, in one embodiment, occupancy sensing from certain laboratory locations where chemical and fume hood use may be possible when said laboratory locations are occupied could be used to create a signal 703 which, when 703 signifies an occupied condition, fan setback override 701 will be set to True. As an alternate embodiment, occupancy signal 703 may be generated from an occupancy schedule that is programmed into the BAS or other external system from 611 or that is programmed into system 611.

Depending on the design of fan 309, 310, 311, it may not be desirable to setback to a lower fan exit velocity when it is raining outside. ANSI Z9.5 recommends a fan exit velocity of 2000 feet per minute or more may be required to prevent moisture from getting into the fan system, which can cause equipment malfunctions or even water migration into locations within the building.

One embodiment uses fan setback override function 701 and a weather/rain signal 704 to prevent fan setback when it is raining outside. In one embodiment, signal 704 may be derived from a rain sensor that is mounted in proximity to the building served by 611.

In this embodiment, rain sensor signal may be connected directly to 611 or it may be read via the BAS 407 or other remote device communication through connection 624. As an alternate embodiment, signal 704 may be obtained from local weather data that is communicated through internet or internet of things (IoT) connection 625. In this embodiment, said weather data may be obtained through what's known in the art as a RESTful interface to an application programming interface (API) provided by an internet weather site. Examples of such sites which offer API's for collecting weather data include but are not limited to: weather.com, wunderground.com, theweathercomany.com and aerisweather.com.

Another embodiment of this invention involves input 705 to the fan setback override function 701, which is based on error conditions in system 611. Error condition 705 enables system 611 to operate with an excellent level of fault tolerance by ensuring that if any number of error conditions associated with system 611 arise, the exhaust fan system will not be allowed to setback to a lower exit velocity. Such error conditions include but are not limited to: a failure with vacuum pump 627, a malfunction with any of the sensors 602, detected blockages or malfunctions associated with any of the valves (612, 615, 618, 621), malfunction within flow control 610, or other malfunctions that are detected within system 611.

Each time through logic loop 516, a sample from one of 614, 617, 620, or 623 is conveyed through tubing 613, 616, 619, or 622, respectively. As embodiments, a number of tubing materials are suitable for this purpose, including but not limited to: high density polyethylene (HDPE), Kynar®, and a number of fluoropolymers including Polytetrafluoroethylene (PTFE) and Polyvinylidene fluoride (PVDF). As an alternate embodiment, tubing 613, 616, 619, 622 are made of stainless steel, such as 308 or 316 stainless tubing. As a preferred embodiment, the tubing is made from Kynar®, has an inner diameter of ⅛ of an inch and an outer diameter of ¼ inch.

Figure 8:
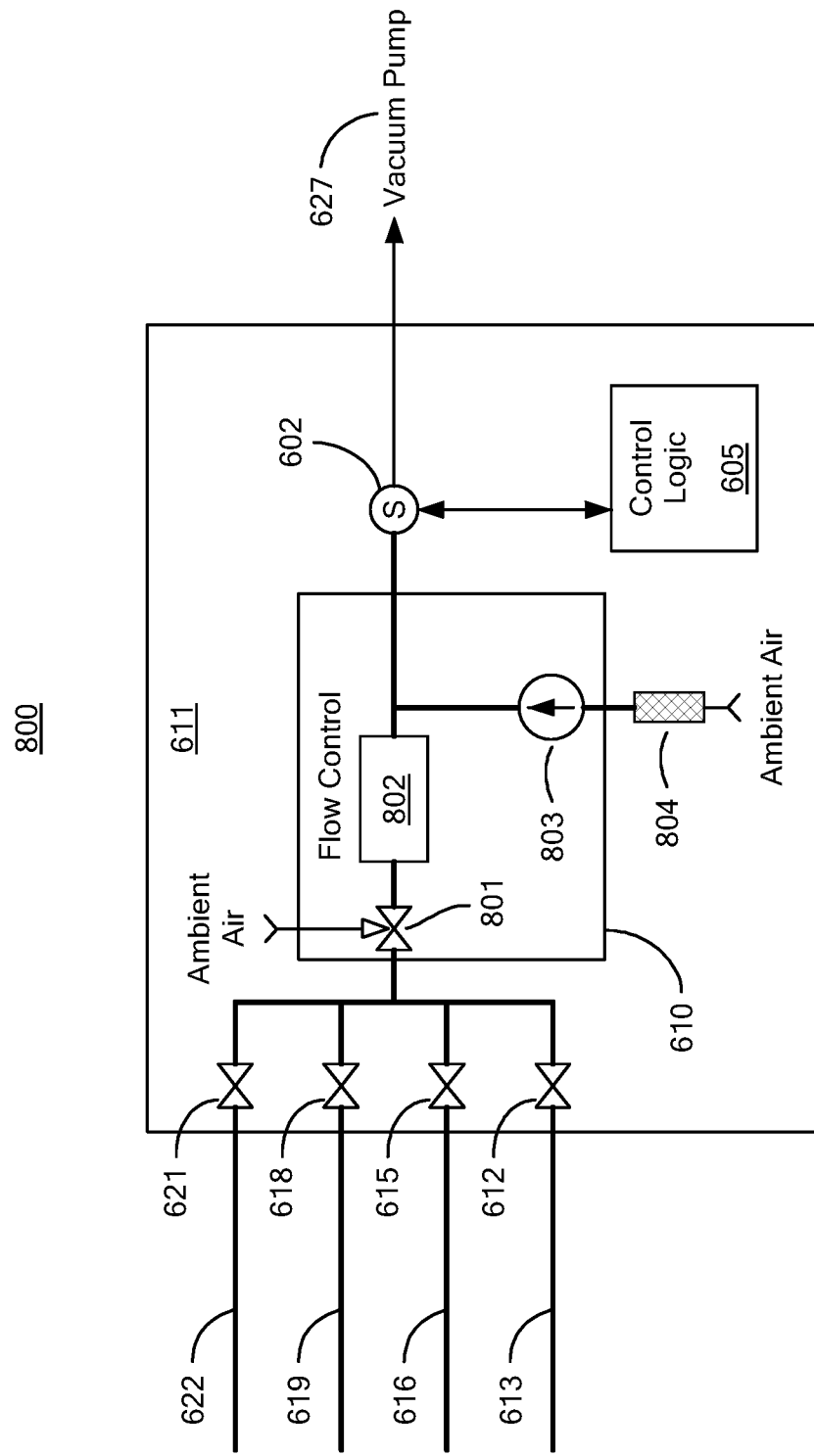
FIG. 8 illustrates embodiments which contribute to the sensor performance in accordance with embodiments of the invention.

Sensor protective mode 509 includes embodiments in addition to protecting sensor 602 by isolating it from exhaust contaminants. FIG. 8 illustrates added embodiments within flow control 610, which are measures to ensure sensor 602 accuracy and reliability. Function block 802 incorporates the airflow regulation necessary to draw air samples in a consistent manner. This includes but is not limited to any type of airflow regulation device such as for example a mass flow controller, or what's known in the art as a critical flow orifice, or a critical flow venturi. Those experienced in the art of air or gas flow control will appreciate that a wide range of approaches exist in the art that are applicable for use in multiplexed air sampling system 611.

Airflow control element 610 in FIG. 8 also incorporates a gas flow device 803, which is intended to provide a number of functions that relate to protective mode 509 operation as well as other operations which are beneficial to the performance of sensor 602, thus ensuring sensor 602 accuracy and reliability. Flow device 803 includes but is not limited to embodiments based on a solenoid valve, a flow orifice, or a mass flow controller. As an embodiment of this invention, flow device 803 protects sensor 602 by providing dilution sampling, which reduces concentrations of contaminants in a controlled manner. In this embodiment, flow device 803 provides a flow of clean air which mixes with the air sample from a monitoring point which flows through 802. Said clean air can include any contaminant free source. For example, it can include relatively clean ambient air, that would be considered clean in comparison to exhaust streams 314, 315, 316, 317. As an alternate embodiment the clean air source may be ambient air that is drawn through a gas cleaning device 804, which may incorporate any form of filtration including but not limited to activated carbon, molecular sieve material, and particulate filtration media. Cleaning device 804 will be selected based upon the sensor elements contained within 602 but, as a preferred embodiment, will usually include media that can remove volatile organic compounds (VOC's) from the ambient air.

In the dilution sampling embodiment, flow device 803 provides a controlled source of clean air that is void of the target gas sensed by 602 in order to reduce the exposure of sensor 602 to that gas. This measure further ensures sensor 602 accuracy and reliability. For example, clean air source 803 may be adjusted by control 610 so that the clean air flow from 803 is delivered at a fixed percentage of the total airflow rate delivered to sensor 602. As a further example, if the airflow rate delivered to sensor 602 is 2 liters per minute and flow device 803 is adjusted to deliver 1 liter per minute, then the air sample delivered through function block 802 will be diluted by 50%. This reduces the maximum exposure seen by sensor 602. Continuing on this example, if the action level 515 of contaminants is 0.4 ppm (as isobutylene), then the dilution of 50% ensures that the maximum exposure of sensor 602 will not exceed 0.2 ppm as isobutylene. In another embodiment, dilution sampling via 802 reduces the exposure of sensor 602 to contaminants that it doesn't sense. For example, in many applications sensors 602 may be a single PID sensor which mostly senses VOC's and some limited number of inorganic compounds. An inorganic compound that it does not sense is nitric acid. Nitric acid fumes will not normally reach concentration levels in an exhaust stream 314, 315, 316, 317 that require high levels of dilution from the exhaust fans 309, 310, 311, however, some low-level exposure of nitric acid over time can contribute to the fouling of sensor 602. By incorporating a dilution sampling component 802, it can dramatically reduce the exposure of that non-sensed parameter. In this embodiment, flow device 803 provides a controlled source of clean air that is void of any gasses likely to be contained within samples taken from a monitoring point. This reduces the exposure of sensor 602 to gases that it both senses or does not sense. As an embodiment, instead of conveying clean air through filter 804, flow device 803 conveys a clean gas from a gas cylinder, which may include but is not limited to pure nitrogen gas, or a mix of nitrogen with oxygen (also known in the art as "zero air").

In another embodiment, which is a further measure to ensure sensor accuracy and reliability, flow device 803 is enabled when sensor protective mode 509 is activated in order to provide a flushing function. In this embodiment when protective mode is activated, sensor 602 only receives clean airflow from device 803 (which in this embodiment may be a solenoid valve or some other airflow switching device) and no airflow is received from flow device 802 during this state. This provides a flushing action that desorbs contaminants from the sensor 602 and its enclosure and tubing. In this embodiment, vacuum pump 627 continues to operate even though air samples will not be conveyed from the monitoring points. In this mode, vacuum pump 627 provides the suction to convey the airflow through 803 and 602. Over the course of operation of multiplexed air sampling system 611, the adsorption of compounds or contaminants from exhaust air streams 314, 315, 316, 317 to the surfaces that sensor 602 is exposed to (for example: sensor 602 enclosure, tubing, and other surfaces in the flow path) can result in low level desorption that alters the accuracy of the sensor 602 readings. By flushing this flow path, it will minimize the buildup of adsorbed contaminants which would augment the accuracy of the sensor 602 reading.

In another embodiment to ensure sensor accuracy and reliability, valve 801 is included within system 611. In this embodiment, valve 801 is a three-way valve, such as a three-way solenoid valve. When the system 801 is sequencing air samples from the monitoring points, such as flow streams 314, 315, 316, 317, three-way valve 801 will provide a flow path between the valves 612, 615, 618, and 621 through which each monitoring point sample is conveyed and flow regulation device 802. As an embodiment, when sensor protective mode 509 is enabled, three-way valve 801 interrupts this flow path and simultaneously provides a flow path between the common side of valves 612, 615, 618, 621 and ambient air. At that moment, in this embodiment, valves 612, 615, 618, and 621 are all commanded to their open position. Each exhaust monitoring point 314, 315, 316, 317 is negatively pressurized, owing to the inherent function of the exhaust fans 309, 310, 311. As was mentioned, typically the plenum 307 to which risers 1,2,3, and 4 connect, is controlled to a fairly high static pressure, such as −4 inches H2O. As a result, with valves 612, 615, 618, and 621 open and valve 801 open to atmosphere (ambient air) this embodiment enables relatively clean ambient air to flow through valve 801 through valves 612, 615, 618, 621, and through tubing 613, 616, 619, 622 where it exits into the negatively pressurized flow streams 314, 315, 316, and 317. This provides a flushing function to tubing 613, 616, 619, and 622 that is advantageous as this action removes adsorbed compounds which setup in the tubing that can over time affect the accuracy of the contaminant readings performed by sensor 602.

Figure 9:
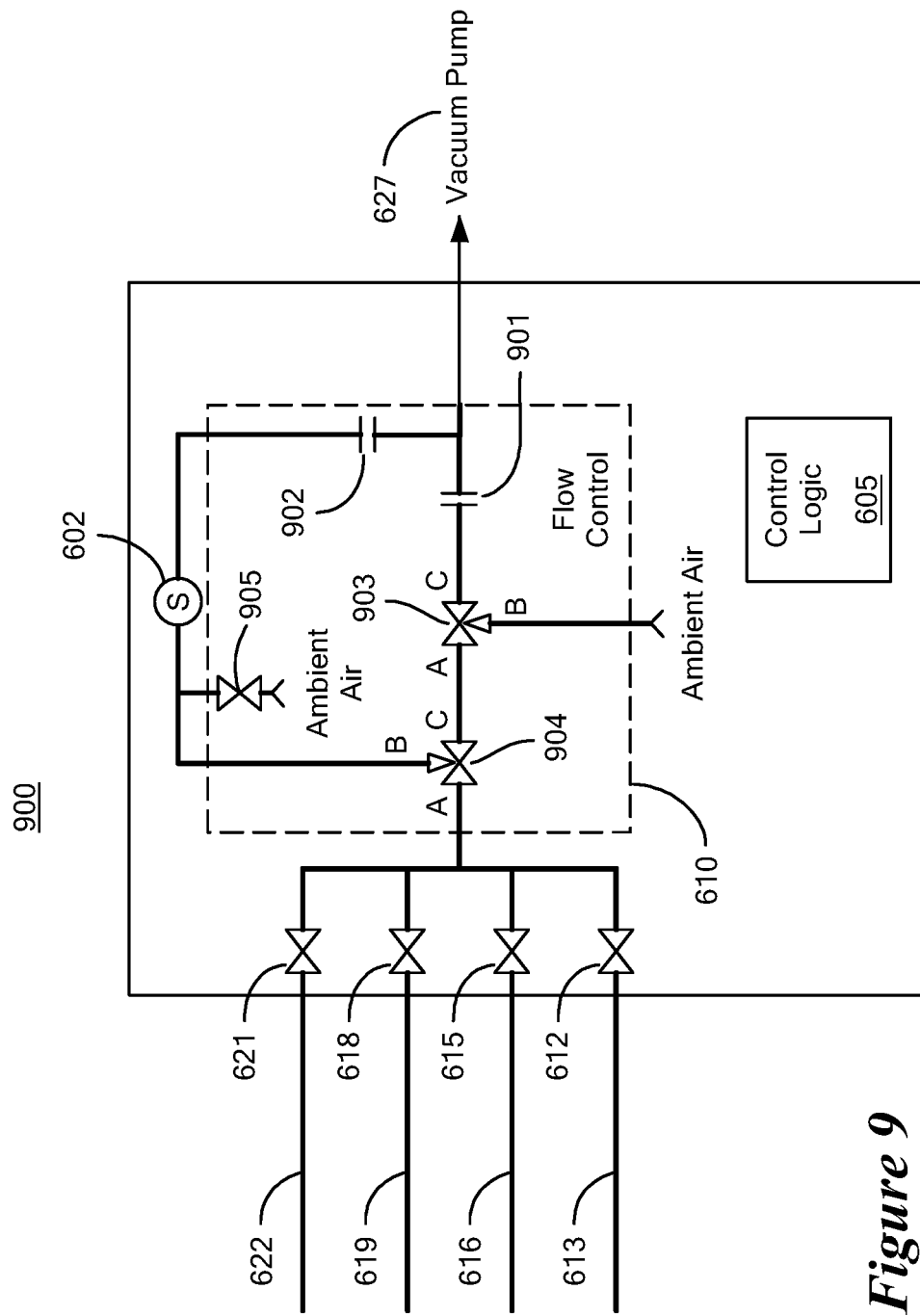
FIG. 9 illustrates additional embodiments which contribute to the sensor performance aspects in accordance with embodiments of the invention.

FIG. 9 illustrates an exemplary multipoint sampling system 900 used in embodiments of this invention. 900 includes an exemplary embodiment of airflow element 610 which incorporates two airflow paths and measures to ensure sensor 602's accuracy and reliability. Flow control 610 within FIG. 9 incorporates two flow control elements, a first high flow element 901 and a second low flow element 902. These flow elements may be any flow control device known in the art but, as embodiments, 901 and 902 are orifices. Orifices provide a low-cost way to regulate airflow rate when in the presence of an applied vacuum, such as that provided by pump 627. In the embodiments of 900 high flow element 901 provides an airflow rate necessary to convey the air samples from each exhaust stream 314, 315, 316, 317 to system 611. This airflow provided by 901 (herein purge flow) is set to a relatively high flow rate compared to that provided by flow element 902 to enable each of the tubings 613, 616, 619, and 622 to be substantially cleared of any previous samples for each step of the sampling sequence. The airflow rate provided by flow element 902 (herein sensing flow) need only be a fraction of the purge flow value, as the sensing flow rate need only convey each air sample a short distance (a few inches) from valves 621, 618, 615, 612 to sensor 602. Typically, tubing 613, 616, 619, and 622 will be 20 to 50 feet or more in length. The sensing flow rate should also be limited to prevent significant pressure drops with sensor 602, which would affect sensor accuracy. As an embodiment, purge flow 901 is set to 15 liters per minute and sensing flow 902 is set to 2 liters per minute.

Embodiments of system 900 incorporate 3-way valves 903 and 904 to control the flow rates during each state of the sampling sequence as controlled by logic 605. Like the operation of air sampling system embodiments 800, system 900 provides sequential air sampling functionality. During normal sampling operation an air sample is conveyed from a location by first placing 610 into its purge flow state. During that time common port A of valve 904 is open to port C, (closed to port B) and common port A of valve 903 is open to port C. This allows the purge flow rate established by element 901 to be applied to the location being sampled. For example, when the control sequence prompts 611 to sample from exhaust stream 317, two-way valve 621 will first be opened with valves 612, 615, and 618 closed. Once the purge flow state has been applied to 317 for a predetermined period of time (which can be variable) the flow state will change to sensing mode (low flow), in which the common port A of valve 904 will be opened to port B and the airflow sample from tubing 622 will be conveyed through 904 to sensor 602 at the lower flow rate established by 902. Like the purge sequence, the sensing sequence is performed for a predetermined period of time. This sensing duration is a function of the response time of the sensor 602, which may include a number of sensors. Therefore, the sensing duration will be a function of the slowest acting sensor. In a preferred embodiment, the purge sequence is fixed at 15 seconds in duration and the sensing sequence duration is 15 seconds. It should be clear to those experienced in the art of multipoint air sampling systems that variable purge and sensing times can be applied. For example, in some applications, one or more sensed locations 314, 315, 316, 317 could be farther away than other sensed locations, and that in such applications it can be advantageous to assign a purge time that may be different for each sensed location. Likewise, when sensor 602 is composed of a plurality of sensors, it can be advantageous to vary the sensing time based on which sensor is enabled as a location is sampled. Therefore, embodiments of this invention apply to both fixed and variable purge and sensing times. As described by inventive logic 500, if contaminant levels that have been sensed by sensor 602 by the end of the sampling sequence do not exceed the predetermined action level 515, then system 900 will continue its sequence by sampling from the next location in the sequence. Alternatively, if the contaminant levels that have been sensed by sensor 602 do exceed the predetermined action level 515, then system 900 will switch into the state of sensor protective mode 509.

As an embodiment of system 900, when the sensor protective mode state 509 has been activated: common port A of valve 904 will be opened to port C of 904, common port A of valve 903 will be opened to port B of 903, two-way valves 621, 618, 615, and 612 to each monitored location will be open. This will isolate the sensor 602 from the contaminant source (314, 315, 316, or 317) and, in one embodiment, place sensor 602 under the full vacuum of 627, which acts to evacuate and desorb contaminants that may have setup within 602, with ensures sensor 602 accuracy and reliability. As an alternate embodiment, which also ensures sensor accuracy and reliability, when in sensor protective mode 509, optional two-way valve 905 will open to the atmosphere or ambient air 906 to enable fresh air to dilute contaminants within sensor 602, as ambient air flows through 905 into sensor 602, through flow element 902 and then out to vacuum pump 627. Ambient air 906 may include any source of clean air, including the air surrounding the system 900. For example, 906 may be air in a mechanical space, outdoor air, or other clean air source. While 900 is in the sensor protective mode state 509, the positions of valves 903 and 904, along with open two-way valves 621, 618, 615, and 612 creates a path for air to flow from ambient air 906, through valve 903, through valve 904 and through valves 621, 618, 615, and 612, to airflow streams 314, 315, 316, and 317. This directional flow from ambient air 906 to 314, 315, 316, and 317 is due to the negative pressure of the exhaust air caused by the exhaust fans 309, 310, 311. This provides a flushing function to tubing 613, 616, 619, and 622 that is advantageous as this action removes adsorbed compounds which setup in the tubing that can over time affect the accuracy of the contaminant readings performed by sensor 602.

FIG. 10 further illustrates example sampling operation of system 900. Shown in FIG. 10 are eight states of the valves of 611 during normal sampling mode, assuming that 900 is configured to monitor four exhaust duct locations (317, 316, 315, 314). However, system 900 may be extended to operate with any number of exhaust duct locations. FIG. 10 also shows a ninth state which illustrates the valve logic of sensor protection mode for system 900. Each state of 900 is assigned a state number for reference purposes. Based on the configuration 900 shown, system 900 begins sampling air stream 317 starting with state 1001, in which 900 is placed into purge mode. In FIG. 10, the state of each valve or valve port pair (A/B, A/C) is signified as "closed" or "open". In each case, "closed" signifies the airflow path is blocked and "open" signifies the airflow path is opened. In state 1001, air will flow through valve 904 from port A to port C and then continue to flow from port A to port C through valve 903 and through high flow element 901. After a predetermined period, such as but not limited to 15 seconds, tubing 622 will be adequately purged and the state of system 900 will change to state 1002, in which system 900 is in sensing mode, as the air sample which was conveyed from 317 to open valve 621 is diverted through valve 904 by opening port A of valve 904 to port B of 904, thus enabling the air sample to flow through sensor element 602 at a flow rate determined by flow element 902. At the end of the state 1002, system 900 evaluates if the sensed concentration of the sample from 317 exceeds the predetermined action level 515. If action level 515 is exceeded, then system 900 will be placed in the sensor protective mode state 509 and fan setback 517 signal will be set to the false state, thus disabling fan setback. If the sample from 317 does not exceed action level 515, system 900 will begin to acquire an air sample in purge mode from the next location via state 1003. This process continues indefinitely until a sensed condition that exceeds action level 515 is encountered, or any number of override conditions (703, 704, 705) are encountered.

FIG. 10 illustrates a scenario where high contaminant levels (contaminant levels which exceed action level 515) are detected in state 1008, while sampling location 314. As shown in FIG. 10, said high contaminant levels will cause system 900 to switch into state 1009, which is the sensor protective mode state with the logic which was described above. When in state 1009, the sampling operation of 900 will be interrupted for a period equal to sequence delay 503 and sensor 602 will be protected from further exposure to contaminant levels.

As has been described, the fan setback signal 517 derived from inventive logic 500 is acted upon by the fan controls or BAS 407 to lower the total airflow through fans 309, 310, and 311 when airflow streams 314, 315, 316, 317 are relatively free of contaminants. In systems where bypass air is present, this would be accomplished by reducing bypass air 301 until a predetermined minimum exit velocity of 312 discharge air is achieved. The end result is a beneficial reduction of fan 309, 310, 311 energy consumption and therefore energy cost. For exhaust fan systems which do not incorporate bypass air 301 the airflow through fans 309, 310, 311 is a function only of total system exhaust 221, which is determined by the total exhaust flows from each lab or room zone served by the exhaust fan system. Therefore, for systems such as this that do not have bypass 301, exhaust fan 203 energy reduction cannot be achieved without lowering laboratory flows. Also, as prior art, when laboratory airflow rates or ACH values are reduced in order to save heating and cooling energy, supply fan 202 energy, and potentially exhaust fan 203 energy, the amount of energy savings that can be achieved is often limited by the amount by which the ECM can reduce the exhaust fan 203 exit velocity while ensuring safe exhaust fan 203 operation under all conditions. Where possible, lab airflow reduction ECMs are accomplished by specifying a lower minimum ACH value for each lab than was specified in the original design. If the existing fan 203 does not incorporate a bypass 301 and 203 was originally sized to just deliver a minimum acceptable exit velocity at the minimum design exhaust CFM of the labs (for example exhaust 204, 205, 207, and 211), then a lab flow reduction ECM will not be possible, as it would result in unsafe exhaust fan operation during some operating periods where the system exhaust 221 is contaminated. As an embodiment of this invention, fan setback signal 517 is used to actively enable flow reductions and energy savings in fan 203 by monitoring exhaust 221 using system 600 and reducing lab air change rates (ACH) when the exhaust is relatively clean. This may be accomplished by interfacing fan setback signal 517 to the BAS or laboratory controls in order to activate a clean exhaust minimum lab ACH value when exhaust 221 is determined by logic 500 to be relatively free of contaminants (concentrations sensed by sensor 602 are lower than the action level 515). FIG. 11 illustrates embodiments of using active sensing logic 500 to reduce fan 203 energy use via a clean exhaust minimum ACH value. The control logic (clean exhaust minimum ACH logic) 1100 incorporates a logic stage 1101 that determines if the fan setback signal 517 is True or False. If 517 is True, the logic proceeds to logic stage 1102 which activates a reduced lab minimum CFM to one or multiple labs served by exhaust fan 203. Logic 1102 is then followed by logic 1101, which again evaluates fan setback signal 517 and if True, the cycle continues through logic 1102. If in logic stage 1101, it is determined that fan setback signal 517 is False, then logic 1100 will proceed to logic stage 1103, which sets the minimum CFM values in the one or more labs served by exhaust fan 203 to their original design minimum value. As prior art, lab minimum CFM is often controlled based on the supply air that is provided to the lab. For example, lab minimum CFM may be determined as the minimum of supply air 206, 209, 210, 212. However, lab minimum CFM may also be determined as the minimum of the exhaust air that is removed from each lab. For example, it may be the minimum of exhausts 204, 205, 207, 208, 211. As embodiments of this invention, the lab minimum CFM implemented by logic 1102 and 1103 may be established in terms of either the exhaust or the supply air to each lab. As an embodiment, an instance of logic 1100 is created in software for each lab whose minimum ventilation is to be adjusted in order to effectively lower the total flow and fan energy of fan 203 when it is determined by logic 500 that the fan 203 may be set back. As an embodiment, logic 1100 may be implemented in the BAS. As an alternate embodiment, logic 1100 may be implemented within a multipoint air sampling system. As an embodiment, 1100 may be implemented as a module within logic 500.

FIG. 12 shows an exemplary computer 1200 that can perform at least part of the processing described herein. The computer 1200 includes a processor 1202, a volatile memory 1204, a non-volatile memory 1206 (e.g., hard disk), an output device 1207 and a graphical user interface (GUI) 1208 (e.g., a mouse, a keyboard, a display, for example). The non-volatile memory 1206 stores computer instructions 1212, an operating system 1216 and data 1218. In one example, the computer instructions 1212 are executed by the processor 1202 out of volatile memory 1204. In one embodiment, an article 1220 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An exhaust demand control system for measuring one or more contaminants at one or more locations within one or a plurality of exhaust ducts or plenums served by an exhaust fan system having one or more exhaust fans, comprising systems configured to:
   sense the one or more contaminants within the one or more locations using a multipoint air sampling system having one or more sensors to determine concentration measurements;
   compare the contaminant concentration measurements from the one or more locations against an action level to create a fan setback signal which controls a setback state of the exhaust fan system;
   prevent the exhaust fan system from instability by controlling an operation of the one or more exhaust fans according to a sequence delay provided by control logic of the control system where the sequence delay is enabled when the contaminant concentration measurements from the one or more locations exceeds the action level, wherein the sequence delay in part determines a minimum time that the fan setback signal is disabled;
   ensure sensor accuracy and reliability by enabling a flow device to provide a sensor flushing function to the one or more sensors, the sensor flushing function being activated for a period of time designated by the sequence delay when contaminant levels above the action level are detected by the one or more sensors, wherein the sensing of the one or more contaminants within the one or more locations is discontinued while the sensor flushing function is activated; and
   incorporate one or more setback override functions to limit when the exhaust fan system is set back.

2. The exhaust demand control system of claim 1, wherein the exhaust fan system includes one or more high plume fans.

3. The exhaust demand control system of claim 1, wherein at least a portion of the one or more exhaust ducts includes one or more exhaust risers.

4. The exhaust demand control system of claim 1 which, as an added measure to ensure sensor accuracy and reliability, further includes providing a dilution sampling function which reduces the one or more sensors from exposure to exhaust contaminants.

5. The exhaust demand control system of claim 1, wherein the multipoint air sampling system comprises a networked air sampling system.

6. The exhaust demand control system of claim 1, wherein the one or more sensors comprises a Photoionization Detector (PID) sensor.

7. The exhaust demand control system of claim 1 further including a tubing flushing function for each tube which connects between the multipoint air sampling system and the one or more locations, wherein the tubing flushing function is configured to activate when contaminant levels above the action level are detected by the multipoint air sampling system; the tubing flushing function being dependent upon a negative pressure associated with each location to which one end of each of the tubes connects and a flow path from atmosphere which is introduced to the other end of each of the tubes through the multipoint air sampling system so that flow of ambient air through each of the tubes removes compounds accumulated within the tubing.

8. The exhaust demand control system of claim 1, wherein the flow device which is enabled to provide a sensor flushing function is a solenoid valve.

9. The exhaust demand control system of claim 1, wherein the one or more setback override functions comprises an occupancy signal.

10. A method of performing exhaust demand control using a system for measuring one or more contaminants at one or more locations within one or a plurality of exhaust ducts or plenums served by an exhaust fan system having one or more exhaust fans, the method comprising:

sensing the one or more contaminants within the one or more locations using a multipoint air sampling system having one or more sensors to determine concentration measurements;

comparing contaminant concentration measurements from the one or more locations against an action level to create a fan setback signal which controls a setback state of the exhaust fan system;

preventing the exhaust fan system from instability by controlling an operation of the one or more exhaust fans according to a sequence delay provided by control logic of the control system where the sequence delay is enabled when the contaminant concentration measurements from the one or more locations exceeds the action level, wherein the sequence delay in part determines a minimum time that the fan setback signal is disabled;

ensuring sensor accuracy and reliability by enabling a flow device to provide a sensor flushing function to the one or more sensors, the sensor flushing function being activated for a period of time designated by the sequence delay when contaminant levels above the action level are detected by the one or more sensors, wherein the sensing of the one or more contaminants within the one or more locations is discontinued while the sensor flushing function is activated; and incorporating one or more setback override functions to limit when the exhaust fan system is set back.

11. The method of claim 10, wherein the exhaust fan system includes one or more high plume fans.

12. The method of claim 10, wherein at least a portion of the one or more exhaust ducts includes one or more exhaust risers.

13. The method of claim 10, wherein the multipoint air sampling system comprises a networked air sampling system.

14. The method of claim 10 which, as an added measure to ensure sensor accuracy and reliability, further includes providing a dilution sampling function which reduces the one or more sensors from exposure to exhaust contaminants.

15. The method of claim 10, wherein the one or more sensors comprises a Photoionization Detector (PID) sensor.

16. The method of claim 10, wherein the exhaust demand control function incorporates clean exhaust minimum ACH logic.

17. The method of claim 10 further including a tubing flushing function for each tube which connects between the multipoint air sampling system and the one or more locations, wherein the tubing flushing function is configured to activate when contaminant levels above the action level are detected by the multipoint air sampling system; the tubing flushing function being dependent upon a negative pressure associated with each location to which one end of each of the tubes connects and a flow path from atmosphere which is introduced to the other end of each of the tubes through the multipoint air sampling system so that flow of ambient air through each of the tubes removes compounds accumulated within the tubing.

18. The method of claim 10, wherein the sequence delay is adaptive.

19. The method of claim 10, wherein the one or more setback override functions comprises an occupancy signal.

20. The method of claim 10, wherein the exhaust demand control function incorporates clean exhaust minimum ACH logic.

* * * * *